(12) United States Patent
Tago

(10) Patent No.: US 11,408,766 B2
(45) Date of Patent: Aug. 9, 2022

(54) DETECTION DEVICE AND OPTICAL FILTER

(71) Applicant: Japan Display Inc., Tokyo (JP)

(72) Inventor: Keiji Tago, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/388,148

(22) Filed: Jul. 29, 2021

(65) Prior Publication Data

US 2022/0034712 A1 Feb. 3, 2022

(30) Foreign Application Priority Data

Jul. 30, 2020 (JP) .............................. JP2020-129265

(51) Int. Cl.
*G01J 1/04* (2006.01)
*G01J 1/42* (2006.01)
*G01J 1/44* (2006.01)

(52) U.S. Cl.
CPC ............ *G01J 1/0437* (2013.01); *G01J 1/0411* (2013.01); *G01J 1/4228* (2013.01); *G01J 1/44* (2013.01)

(58) Field of Classification Search
CPC ...... G01J 1/0437; G01J 1/0462; G01J 1/0411; G01J 1/0407; G01J 1/04; G01J 1/4228; G01J 1/42; G01J 1/44; G01J 2001/4413; G01J 2001/4446; G01J 2001/446

See application file for complete search history.

(56) References Cited

U.S. PATENT DOCUMENTS

| 10,746,595 B2* | 8/2020 | Chen ....................... B29C 65/48 |
| 10,852,182 B2* | 12/2020 | Vu ......................... G01J 1/1626 |
| 11,143,550 B2* | 10/2021 | Etschmaier ........... G01J 3/0205 |
| 2019/0186988 A1* | 6/2019 | Hasegawa ................ G01J 1/06 |
| 2020/0089928 A1 | 3/2020 | Long |
| 2021/0172791 A1* | 6/2021 | Le Neel .............. H01L 27/1446 |

FOREIGN PATENT DOCUMENTS

JP        H09171154 A        6/1997

\* cited by examiner

*Primary Examiner* — John R Lee
(74) *Attorney, Agent, or Firm* — K&L Gates LLP

(57) ABSTRACT

According to an aspect, a detection device includes: a substrate; a plurality of photodiodes arranged on the substrate; a protective film that covers the photodiodes; a plurality of lenses provided so as to overlap the respective photodiodes; a first light-blocking layer that is provided between the photodiodes and the lenses and is provided with first openings in regions overlapping the respective photodiodes; and a second light-blocking layer that is provided between the first light-blocking layer and the lenses and is provided with second openings in regions overlapping the respective photodiodes and the respective first openings. The first light-blocking layer is provided with slits in regions overlapping gaps between the photodiodes adjacent to each other, and the second light-blocking layer is provided so as to be continuous across the photodiodes adjacent to each other and is provided so as to overlap the slits.

9 Claims, 15 Drawing Sheets

FIG.12
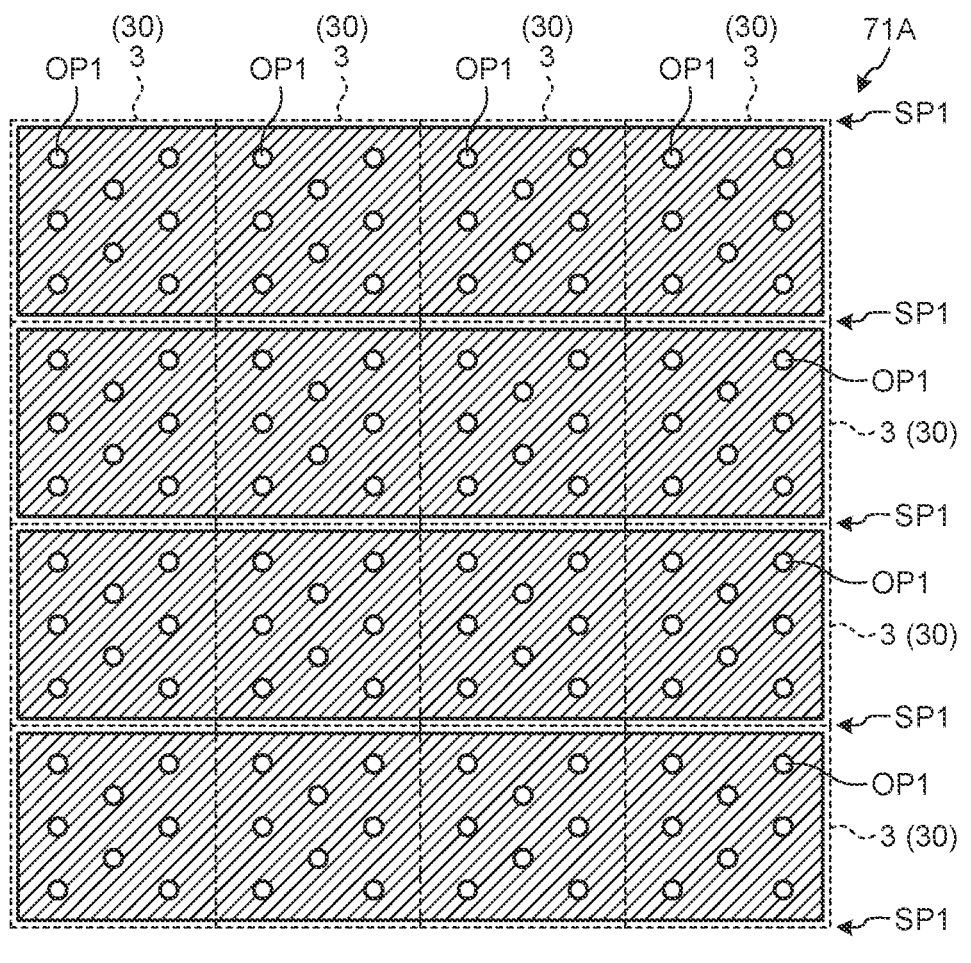
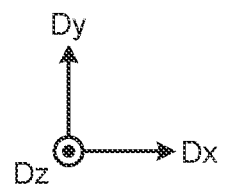

FIG.14
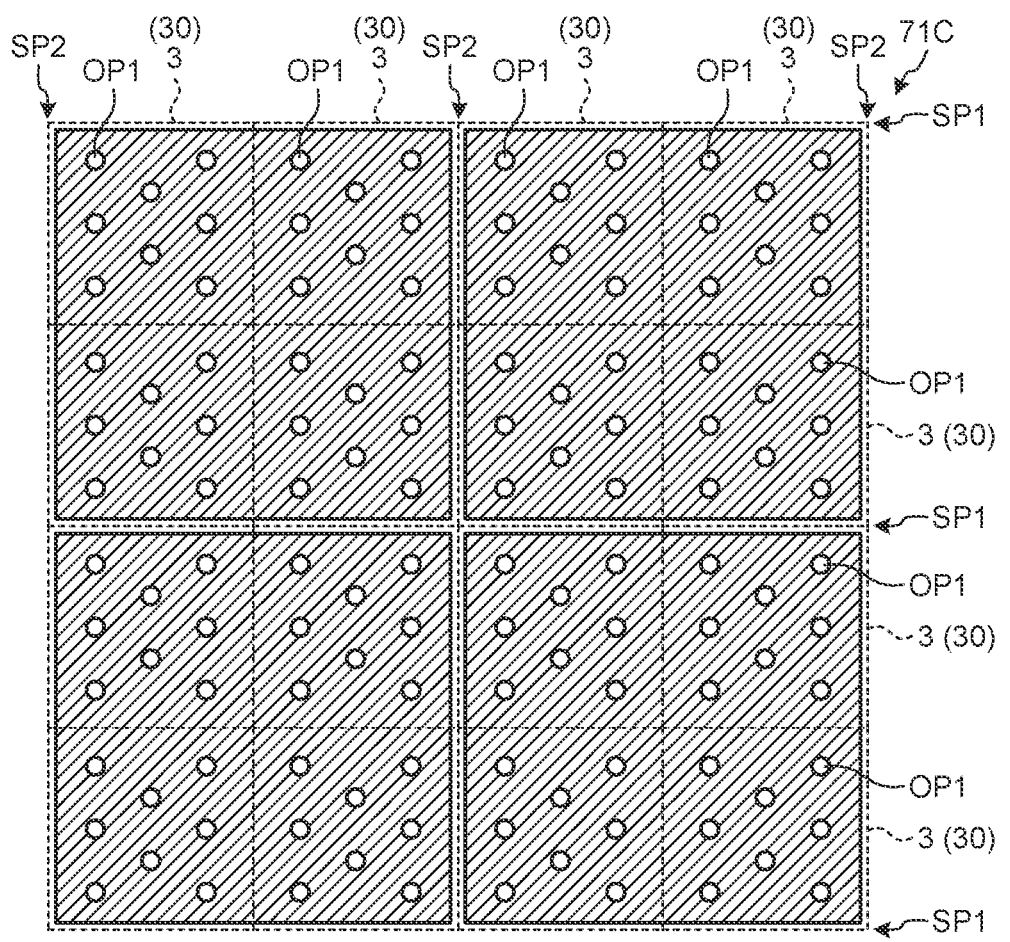
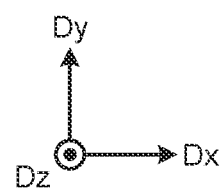

DETECTION DEVICE AND OPTICAL FILTER

CROSS-REFERENCE TO RELATED APPLICATION

This application claims the benefit of priority from Japanese Patent Application No. 2020-129265 filed on Jul. 30, 2020, the entire contents of which are incorporated herein by reference.

BACKGROUND

1. Technical Field

What is disclosed herein relates to a detection device and an optical filter.

2. Description of the Related Art

Japanese Patent Application Laid-open Publication No. H9-171154 describes an image input optical system that includes a lens array formed by arranging a plurality of lenses, a photosensor array formed by arranging a plurality of photosensors, and a pinhole array provided between the lens array and the photosensor array. United States Patent Application Publication No. 2020/0089928 describes an optical imaging device that includes a light-blocking layer provided with an opening between a microlens and a photosensor.

In such a detection device, what is called crosstalk may occur in which light in an oblique direction enters other photosensors. This phenomenon may cause, for example, image blurring to degrade the detection accuracy. Since the light-blocking layer is provided so as to cover an array substrate provided with a plurality of the photosensors, for example, a difference in thermal shrinkage may cause shape defects, such as asperities or wrinkles, of the light-blocking layer.

SUMMARY

According to an aspect, a detection device includes: a substrate; a plurality of photodiodes arranged on the substrate; a protective film that covers the photodiodes; a plurality of lenses provided so as to overlap the respective photodiodes; a first light-blocking layer that is provided between the photodiodes and the lenses and is provided with first openings in regions overlapping the respective photodiodes; and a second light-blocking layer that is provided between the first light-blocking layer and the lenses and is provided with second openings in regions overlapping the respective photodiodes and the respective first openings. The first light-blocking layer is provided with slits in regions overlapping gaps between the photodiodes adjacent to each other, and the second light-blocking layer is provided so as to be continuous across the photodiodes adjacent to each other and is provided so as to overlap the slits.

According to an aspect, an optical filter includes: a protective film; a plurality of first light-blocking layers that are directly formed on the protective film and are arranged in a matrix having a row-column configuration; a second light-blocking layer overlapping the first light-blocking layers; a plurality of lenses; a first light-transmitting resin layer located between the first light-blocking layers and the second light-blocking layer; and a second light-transmitting resin layer located between the second light-blocking layer and the lenses. The first light-blocking layers are arranged so as to be separated from one another by slits between the first light-blocking layers adjacent to each other, the first light-blocking layers being not formed in the slits. Each of the first light-blocking layers has a plurality of first openings. The second light-blocking layer has second openings overlapping the respective first openings. The lenses overlap the respective first openings and the respective second openings.

BRIEF DESCRIPTION OF THE DRAWINGS

FIG. 12 is a plan view schematically illustrating a first light-blocking layer according to a fourth modification of the embodiment;

FIG. 14 is a plan view schematically illustrating a first light-blocking layer according to a sixth modification of the embodiment.

DETAILED DESCRIPTION

Figure 1A:
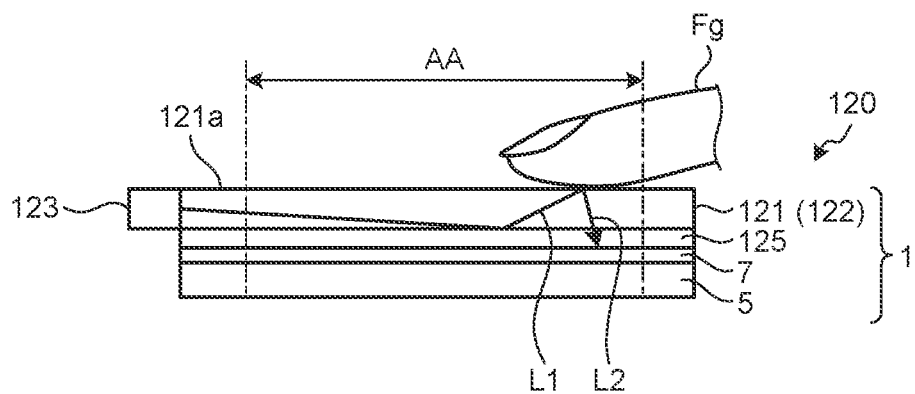
FIG. 1A is a sectional view illustrating a schematic sectional configuration of a detection apparatus with an illumination device, the detection apparatus including a detection device according to an embodiment of the present disclosure.

The following describes a mode (embodiment) for carrying out the present disclosure in detail with reference to the drawings. The present disclosure is not limited to the description of the embodiment given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the disclosure. To further clarify the description, widths, thicknesses, shapes, and the like of various parts may be schematically illustrated in the drawings as compared with actual aspects thereof. However, they are merely examples, and interpretation of the present disclosure is not limited thereto. The same component as that described with reference to an already mentioned drawing is denoted by the same reference numeral through the disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

Figure 1B:
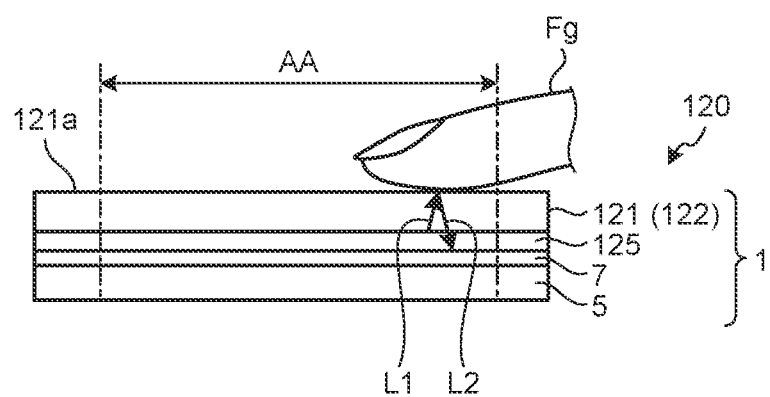
FIG. 1B is a sectional view illustrating a schematic sectional configuration of the detection apparatus with an illumination device, the detection apparatus including the detection device according to a first modification of the embodiment.
Figure 1C:
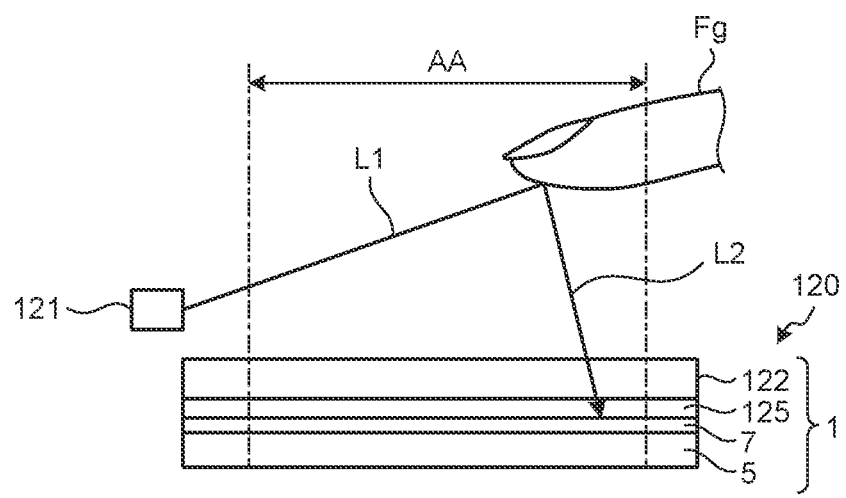
FIG. 1C is a sectional view illustrating a schematic sectional configuration of the detection apparatus with an illumination device, the detection apparatus including the detection device according to a second modification of the embodiment.
Figure 1D:
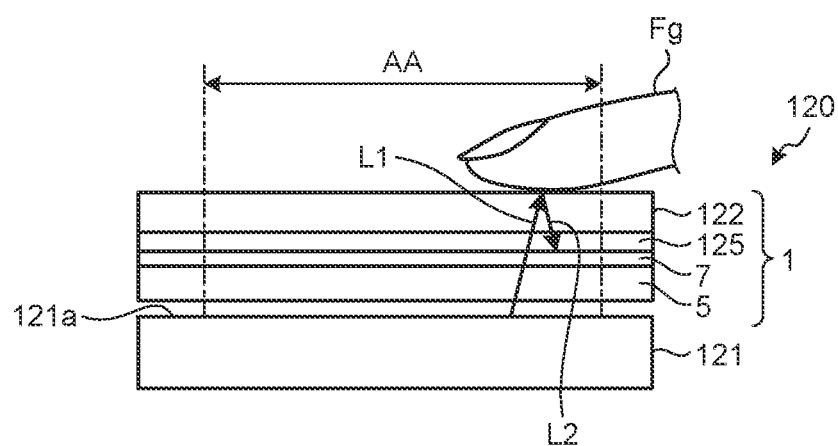
FIG. 1D is a sectional view illustrating a schematic sectional configuration of the detection apparatus with an illumination device, the detection apparatus including the detection device according to a third modification of the embodiment.

FIG. 1A is a sectional view illustrating a schematic sectional configuration of a detection apparatus with an illumination device, the detection apparatus including a detection device according to an embodiment of the present disclosure. FIG. 1B is a sectional view illustrating a schematic sectional configuration of the detection apparatus with an illumination device, the detection apparatus including the detection device according to a first modification of the embodiment. FIG. 1C is a sectional view illustrating a schematic sectional configuration of the detection apparatus with an illumination device, the detection apparatus including the detection device according to a second modification of the embodiment. FIG. 1D is a sectional view illustrating a schematic sectional configuration of the detection apparatus with an illumination device, the detection apparatus including the detection device according to a third modification of the embodiment.

As illustrated in FIG. 1A, a detection apparatus 120 with an illumination device includes a detection device 1 and an illumination device 121. The detection device 1 includes a sensor substrate 5, an optical filter 7, an adhesive layer 125, and a cover member 122. That is, the sensor substrate 5, the optical filter 7, the adhesive layer 125, and the cover member 122 are stacked in the order as listed, in a direction orthogonal to a surface of the sensor substrate 5. The cover member 122 of the detection device 1 can be replaced with the illumination device 121, as will be described later. The adhesive layer 125 only needs to bond the optical filter 7 to the cover member 122. Hence, the detection device 1 may have a structure without the adhesive layer 125 in a region corresponding to a detection region AA. When the adhesive layer 125 is absent in the detection region AA, the detection device 1 has a structure in which the adhesive layer 125 bonds the cover member 122 to the optical filter 7 in a region corresponding to a peripheral region GA outside the detection region AA. The adhesive layer 125 provided in the detection region AA may be simply paraphrased as a protective layer for the optical filter 7.

As illustrated in FIG. 1A, the illumination device 121 may be, for example, what is called a side light-type front light that uses the cover member 122 as a light guide plate provided at a location corresponding to a detection region AA of the detection device 1, and that includes a plurality of light sources 123 arranged side by side at one end or both ends of the cover member 122. That is, the cover member 122 has a light-emitting surface 121a for emitting light, and serves as one component of the illumination device 121. The illumination device 121 emits light L1 from the light-emitting surface 121a of the cover member 122 toward a finger Fg serving as a detection target. For example, light-emitting diodes (LEDs), which emit light in a predetermined color, are used as the light sources.

As illustrated in FIG. 1B, the illumination device 121 may include light sources (such as LEDs) provided immediately below the detection region AA of the detection device 1, and the illumination device 121 including the light sources serves also as the cover member 122.

The illumination device 121 is not limited to the example of FIG. 1B. As illustrated in FIG. 1C, the illumination device 121 may be provided on a lateral side of or above the cover member 122, and may emit the light L1 to the finger Fg from the lateral side of or above the finger Fg.

Furthermore, as illustrated in FIG. 1D, the illumination device 121 may be what is called a direct-type backlight that includes light sources (such as LEDs) provided in the detection region AA of the detection device 1.

The light L1 emitted from the illumination device 121 is reflected as light L2 by the finger Fg serving as the detection target. The detection device 1 detects the light L2 reflected by the finger Fg to detect asperities (such as a fingerprint) on the surface of the finger Fg. The detection device 1 may further detect the light L2 reflected inside the finger Fg to detect information on a living body in addition to detecting the fingerprint. Examples of the information on the living body include an image of blood vessels such as veins, pulsation, and a pulse wave. The color of the light L1 from the illumination device 121 may be varied depending on the detection target.

The cover member 122 is a member for protecting the sensor substrate 5 and the optical filter 7, and covers the sensor substrate 5 and the optical filter 7. The illumination device 121 may have a structure to double as the cover member 122 as described above. In the structures illustrated in FIGS. 1C and 1D in which the cover member 122 is separate from the illumination device 121, the cover member 122 is, for example, a glass substrate. The cover member 122 is not limited to the glass substrate, and may be, for example, a resin substrate. The cover member 122 need not be provided. In this case, the surface of the sensor substrate 5 and the optical filter 7 is provided with a protective layer of, for example, an insulating film, and the finger Fg contacts the protective layer of the detection device 1.

As illustrated in FIG. 1B, the detection apparatus 120 with an illumination device may be provided with a display panel instead of the illumination device 121. The display panel may be, for example, an organic electroluminescent (EL) diode (organic light-emitting diode (OLED)) display panel or an inorganic EL display (micro-LED or mini-LED). Alternatively, the display panel may be a liquid crystal display (LCD) panel using liquid crystal elements as display elements or an electrophoretic display (EPD) panel using electrophoretic elements as display elements. Also in this case, the fingerprint of the finger Fg and the information on the living body can be detected based on the light L2 resulting from the reflection of the display light (light L1), which has been emitted from the display panel, by the finger Fg.

Figure 2:
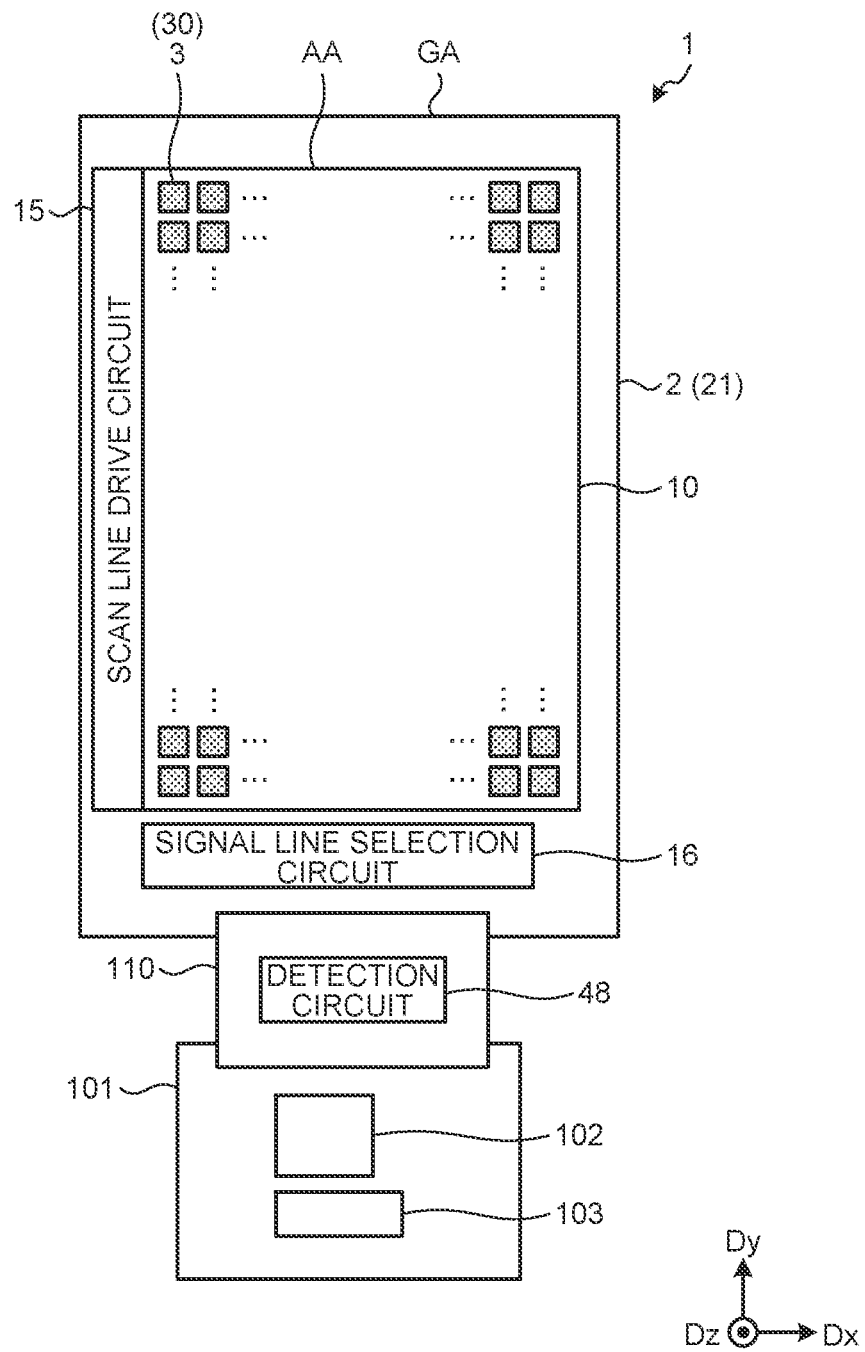
FIG. 2 is a plan view illustrating the detection device according to the embodiment.

FIG. 2 is a plan view illustrating the detection device according to the embodiment. A first direction Dx illustrated in FIG. 2 and the subsequent drawings is one direction in a plane parallel to a substrate 21. A second direction Dy is a direction in the plane parallel to the substrate 21 and is a direction orthogonal to the first direction Dx. The second direction Dy may intersect the first direction Dx without being orthogonal thereto. A third direction Dz is a direction orthogonal to the first direction Dx and the second direction Dy and is a direction normal to the substrate 21.

As illustrated in FIG. 2, the detection device 1 includes an array substrate 2 (substrate 21), a sensor 10, a scan line drive circuit 15, a signal line selection circuit 16, a detection circuit 48, a control circuit 102, and a power supply circuit 103.

The substrate 21 is electrically coupled to a control substrate 101 through a wiring substrate 110. The wiring substrate 110 is, for example, a flexible printed circuit board or a rigid circuit board. The wiring substrate 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor 10, the scan line drive circuit 15, and the signal line selection circuit 16 to control operations of the sensor 10. The power supply circuit 103 supplies voltage signals including, for example, a power supply potential VDD and a reference potential VCOM (refer to FIG. 4) to the sensor 10, the scan line drive circuit 15, and the signal line selection circuit 16. Although the present embodiment exemplifies the case of disposing the detection circuit 48 on the wiring substrate 110, the present disclosure is not limited to this case. The detection circuit 48 may be disposed on the substrate 21.

The substrate 21 has the detection region AA and the peripheral region GA. The detection region AA and the peripheral region GA extend in planar directions parallel to the substrate 21. Elements (detection elements 3) of the sensor 10 are provided in the detection region AA. The peripheral region GA is a region outside the detection region AA and is a region not provided with the elements (detection elements 3). That is, the peripheral region GA is a region between the outer circumference of the detection region AA and outer edges of the substrate 21. The scan line drive circuit 15 and the signal line selection circuit 16 are provided in the peripheral region GA. The scan line drive circuit 15 is provided in a region extending along the second direction Dy in the peripheral region GA. The signal line selection circuit 16 is provided in a region extending along the first direction Dx in the peripheral region GA, and is provided between the sensor 10 and the detection circuit 48.

Each of the detection elements 3 of the sensor 10 is a photosensor including a photodiode 30 as a sensor element. The photodiode 30 is a photoelectric conversion element, and outputs an electrical signal corresponding to light irradiating each of the photodiodes 30. More specifically, the photodiode 30 is a positive-intrinsic-negative (PIN) photodiode. The photodiode 30 may be paraphrased as an organic photodiode (OPD). The detection elements 3 are arranged in a matrix having a row-column configuration in the detection region AA. The photodiode 30 included in each of the detection elements 3 performs the detection in accordance with a gate drive signal (for example, a reset control signal RST or a read control signal RD) supplied from the scan line drive circuit 15. Each of the photodiodes 30 outputs the electrical signal corresponding to the light irradiating the photodiode 30 as a detection signal Vdet to the signal line selection circuit 16. The detection device 1 detects the information on the living body based on the detection signals Vdet received from the photodiodes 30.

Figure 3:
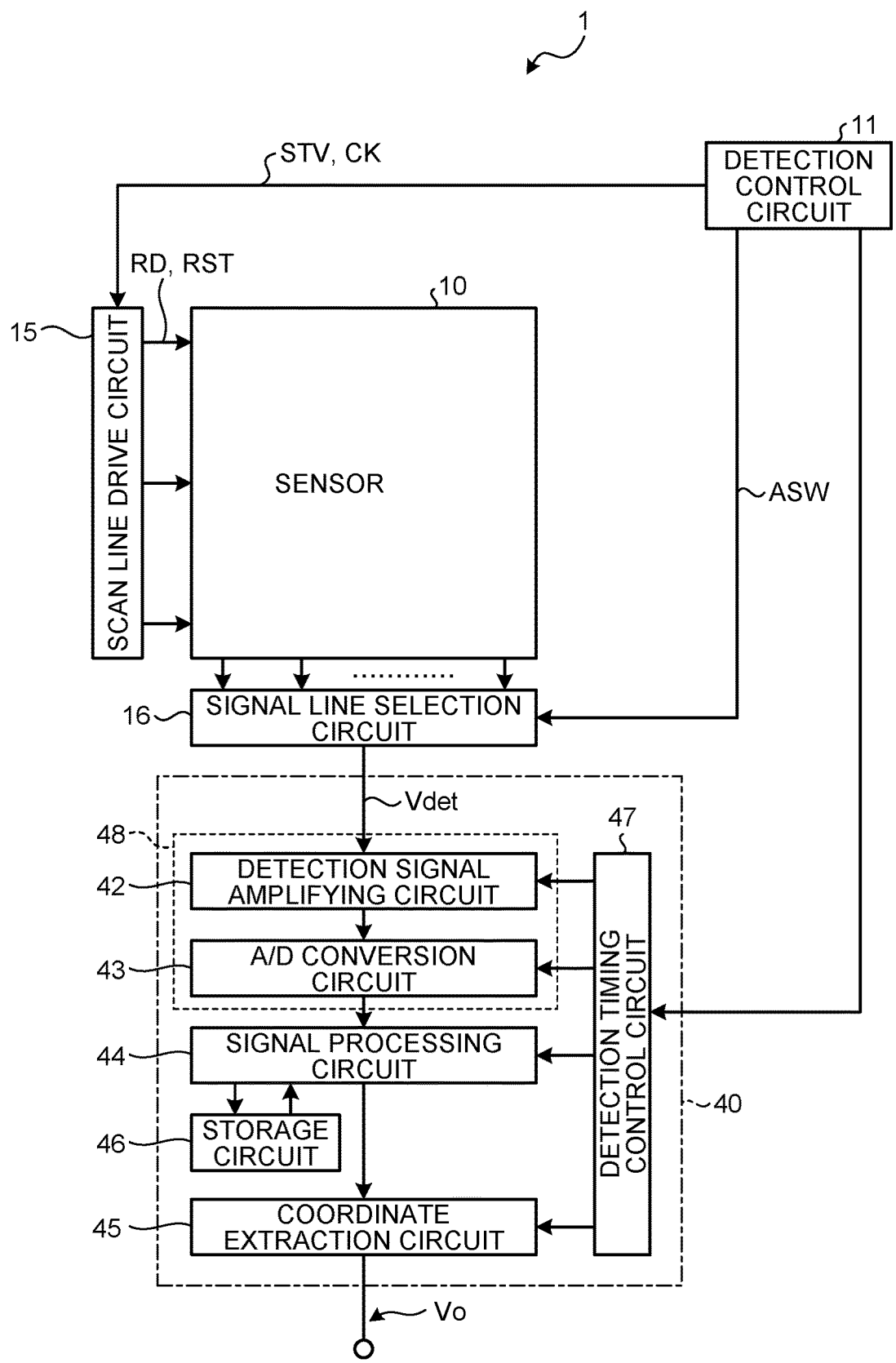
FIG. 3 is a block diagram illustrating a configuration example of the detection device according to the embodiment.

FIG. 3 is a block diagram illustrating a configuration example of the detection device according to the embodiment. As illustrated in FIG. 3, the detection device 1 further includes a detection control circuit 11 and a detector 40. One, some, or all functions of the detection control circuit 11 are included in the control circuit 102. One, some, or all functions of the detector 40 other than those of the detection circuit 48 are also included in the control circuit 102.

The detection control circuit 11 supplies control signals to the scan line drive circuit 15, the signal line selection circuit 16, and the detector 40 to control operations of these components. The detection control circuit 11 supplies various control signals including, for example, a start signal STV and a clock signal CK to the scan line drive circuit 15. The detection control circuit 11 also supplies various control signals including, for example, a selection signal ASW to the signal line selection circuit 16.

The scan line drive circuit 15 drives a plurality of scan lines (read control scan line GLrd and reset control scan lines GLrst (refer to FIG. 4)) based on the various control signals. The scan line drive circuit 15 sequentially or simultaneously selects the scan lines and supplies the gate drive signal (for example, the reset control signal RST or the read control signal RD) to the selected scan lines. Through this operation, the scan line drive circuit 15 selects the photodiodes 30 coupled to the scan lines.

Figure 4:
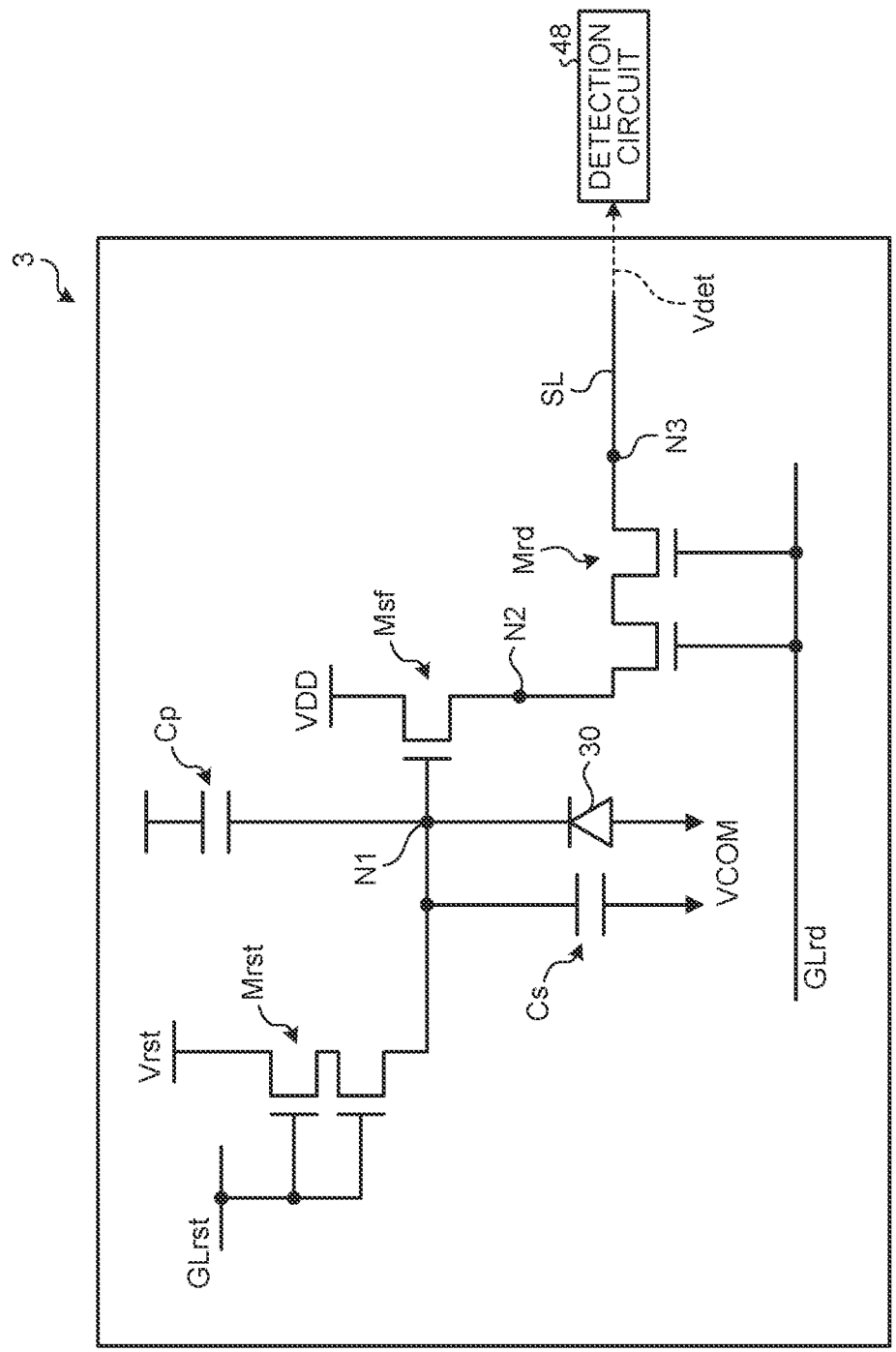
FIG. 4 is a circuit diagram illustrating a detection element.

The signal line selection circuit 16 is a switching circuit that sequentially or simultaneously selects output signal lines SL (refer to FIG. 4). The signal line selection circuit 16 is, for example, a multiplexer. The signal line selection circuit 16 couples the selected output signal lines SL to the detection circuit 48 based on the selection signal ASW supplied from the detection control circuit 11. Through this operation, the signal line selection circuit 16 outputs the detection signal Vdet of the photodiode 30 to the detector 40.

The detector 40 includes the detection circuit 48, a signal processing circuit 44, a coordinate extraction circuit 45, a storage circuit 46, and a detection timing control circuit 47. The detection timing control circuit 47 performs control to cause the detection circuit 48, the signal processing circuit 44, and the coordinate extraction circuit 45 to operate in synchronization with one another based on a control signal supplied from the detection control circuit 11.

The detection circuit 48 is, for example, an analog front end (AFE) circuit. The detection circuit 48 is a signal processing circuit having functions of at least a detection signal amplifying circuit 42 and an analog-to-digital (A/D) conversion circuit 43. The detection signal amplifying circuit 42 is a circuit that amplifies the detection signal Vdet, and is, for example, an integration circuit. The A/D conversion circuit 43 converts an analog signal output from the detection signal amplifying circuit 42 into a digital signal.

The signal processing circuit 44 is a logic circuit that detects a predetermined physical quantity received by the sensor 10 based on output signals of the detection circuit 48. The signal processing circuit 44 can detect asperities on a surface of the finger Fg or a palm based on the signals from the detection circuit 48 when the finger Fg is in contact with or in proximity to a detection surface. The signal processing circuit 44 may detect the information on the living body based on the signals from the detection circuit 48. Examples of the information on the living body include a blood vessel image, a pulse wave, pulsation, and blood oxygen saturation of the finger Fg or the palm.

The storage circuit 46 temporarily stores therein signals calculated by the signal processing circuit 44. The storage circuit 46 may be, for example, a random-access memory (RAM) or a register circuit.

The coordinate extraction circuit 45 is a logic circuit that obtains detected coordinates of the asperities on the surface of the finger Fg or the like when the contact or proximity of the finger Fg is detected by the signal processing circuit 44. The coordinate extraction circuit 45 is the logic circuit that also obtains detected coordinates of blood vessels of the finger Fg or the palm. The coordinate extraction circuit 45 combines the detection signals Vdet output from the respective detection elements 3 of the sensor 10 to generate two-dimensional information representing a shape of the asperities on the surface of the finger Fg or the like. The coordinate extraction circuit 45 may output the detection signals Vdet as sensor outputs Vo instead of calculating the detected coordinates.

The following describes a circuit configuration example of the detection device 1. FIG. 4 is a circuit diagram illustrating the detection element. As illustrated in FIG. 4, the detection element 3 includes the photodiode 30, a reset transistor Mrst, a read transistor Mrd, and a source follower transistor Msf. The reset transistor Mrst, the read transistor Mrd, and the source follower transistor Msf are provided correspondingly to each of the photodiodes 30. Each of the reset transistor Mrst, the read transistor Mrd, and the source follower transistor Msf is made up of an n-type thin-film transistor (TFT). However, each of the transistors is not limited thereto, and may be made up of a p-type TFT.

The reference potential VCOM is applied to an anode of the photodiode 30. A cathode of the photodiode 30 is coupled to a node N1. The node N1 is coupled to a capacitive element Cs, one of the source and the drain of the reset transistor Mrst, and the gate of the source follower transistor Msf. In addition, the node N1 has parasitic capacitance Cp. When light enters the photodiode 30, a signal (electrical charge) output from the photodiode 30 is stored in the capacitive element Cs. The capacitive element Cs includes capacitance generated between an upper conductive layer 34 and a lower conductive layer 35 (refer to FIG. 11) that are coupled to the photodiode 30. The parasitic capacitance Cp includes capacitance added to the capacitive element Cs and also generated among various types of wiring and electrodes provided on the array substrate 2.

The gates of the reset transistor Mrst are coupled to the reset control scan line GLrst. The other one of the source and the drain of the reset transistor Mrst is supplied with a reset potential Vrst. When the reset transistor Mrst is turned on (into a conduction state) in response to the reset control signal RST, the potential of the node N1 is reset to the reset potential Vrst. The reference potential VCOM is lower than the reset potential Vrst, and the photodiode 30 is driven in a reverse bias state.

The source follower transistor Msf is coupled between a terminal supplied with the power supply potential VDD and the read transistor Mrd (node N2). The gate of the source follower transistor Msf is coupled to the node N1. The gate of the source follower transistor Msf is supplied with the signal (electrical charge) generated by the photodiode 30. This operation causes the source follower transistor Msf to output a voltage signal corresponding to the signal (electrical charge) generated by the photodiode 30 to the read transistor Mrd.

The read transistor Mrd is coupled between the source of the source follower transistor Msf (node N2) and the output signal line SL (node N3). The gates of the read transistor Mrd are coupled to the read control scan line GLrd. When the read transistor Mrd is turned on in response to the read control signal RD, the signal output from the source follower transistor Msf, that is, the voltage signal corresponding to the signal (electrical charge) generated by the photodiode 30 is output as the detection signal Vdet to the output signal line SL.

In the example illustrated in FIG. 4, the reset transistor Mrst and the read transistor Mrd each have what is called a double-gate structure configured by coupling two transistors in series. However, the reset transistor Mrst and the read transistor Mrd are not limited to this structure, and may have a single-gate structure, or a multi-gate structure including three or more transistors coupled in series. The circuit of the detection element 3 is not limited to the configuration including the three transistors of the reset transistor Mrst, the source follower transistor Msf, and the read transistor Mrd. The detection element 3 may include two transistors, or four or more transistors.

Figure 5:
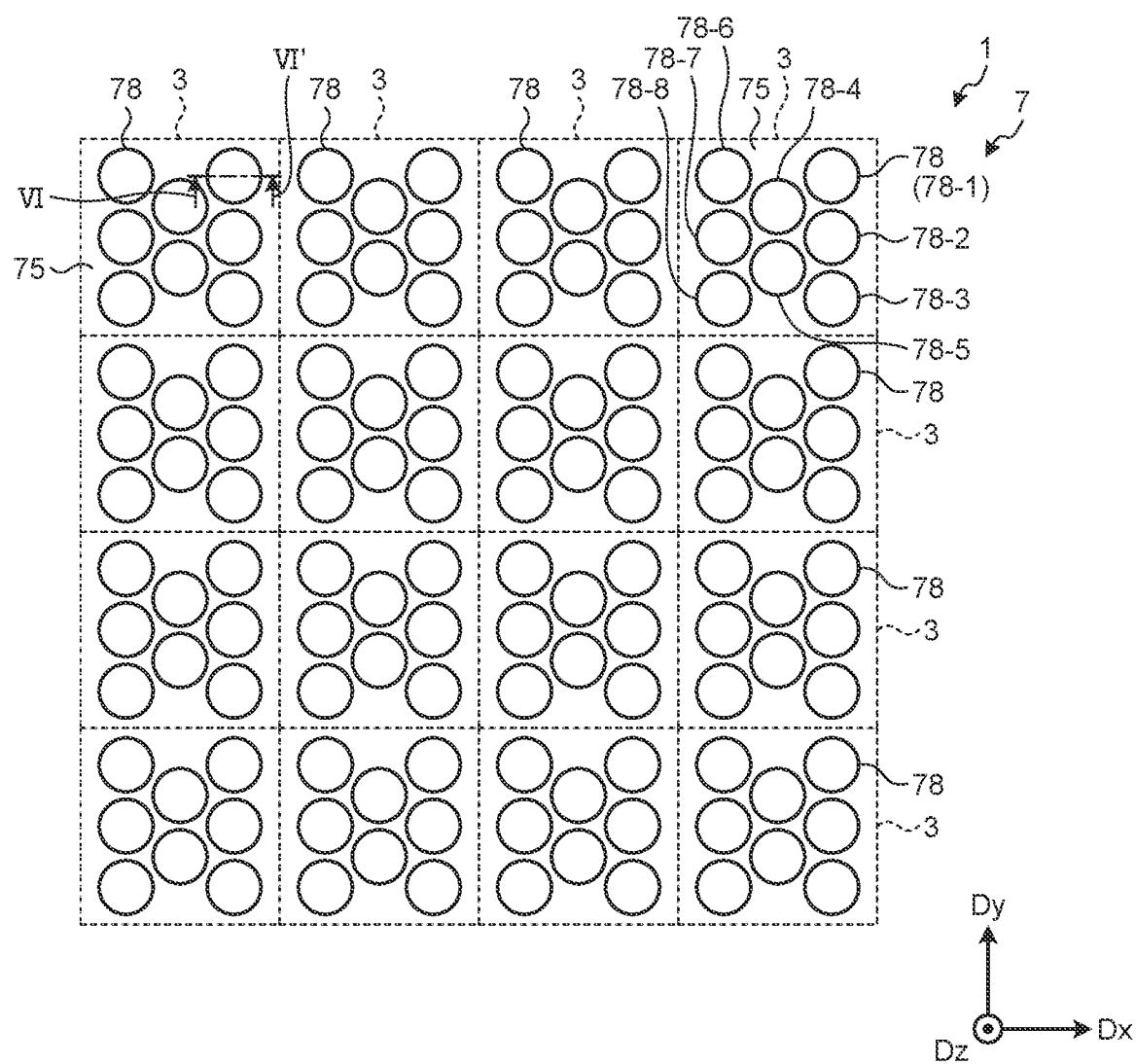
FIG. 5 is a plan view illustrating an optical filter according to the embodiment.

The following describes a detailed configuration of the detection elements 3 and the optical filter 7. FIG. 5 is a plan view illustrating the optical filter according to the embodiment. The optical filter 7 is an optical element that transmits, toward the photodiode 30, a component traveling in the third direction Dz of the light L2 reflected by an object to be detected such as a finger Fg, and blocks components traveling in oblique directions of the light L2. The optical filter 7 is also called collimated apertures, or a collimator.

As illustrated in FIG. 5, the optical filter 7 is provided so as to cover the detection elements 3 (photodiodes 30) arranged in a matrix having a row-column configuration. The optical filter 7 includes a first light-transmitting resin layer 74 and a second light-transmitting resin layer 75 that cover the detection elements 3, and includes a plurality of lenses 78 provided for each of the detection elements 3. The lenses 78 are arranged for each of the detection elements 3. In the example illustrated in FIG. 5, eight lenses 78-1, 78-2, ..., 78-8 are provided for each of the detection elements 3. The lenses 78-1, 78-2, ..., 78-8 are arranged in a triangular lattice pattern. As will be described later, each of the detection elements 3 has a plurality of detection regions (partial photodiodes 30S), thus having a structure in which the lenses 78 correspond to the detection regions in the detection element 3.

The number of the lenses 78 arranged in each of the detection elements 3 may be seven or smaller, or nine of larger so as to match the number of the detection regions. The arrangement of the lenses 78 may also be changed as appropriate according to the configuration of the photodiodes 30.

Figure 6:
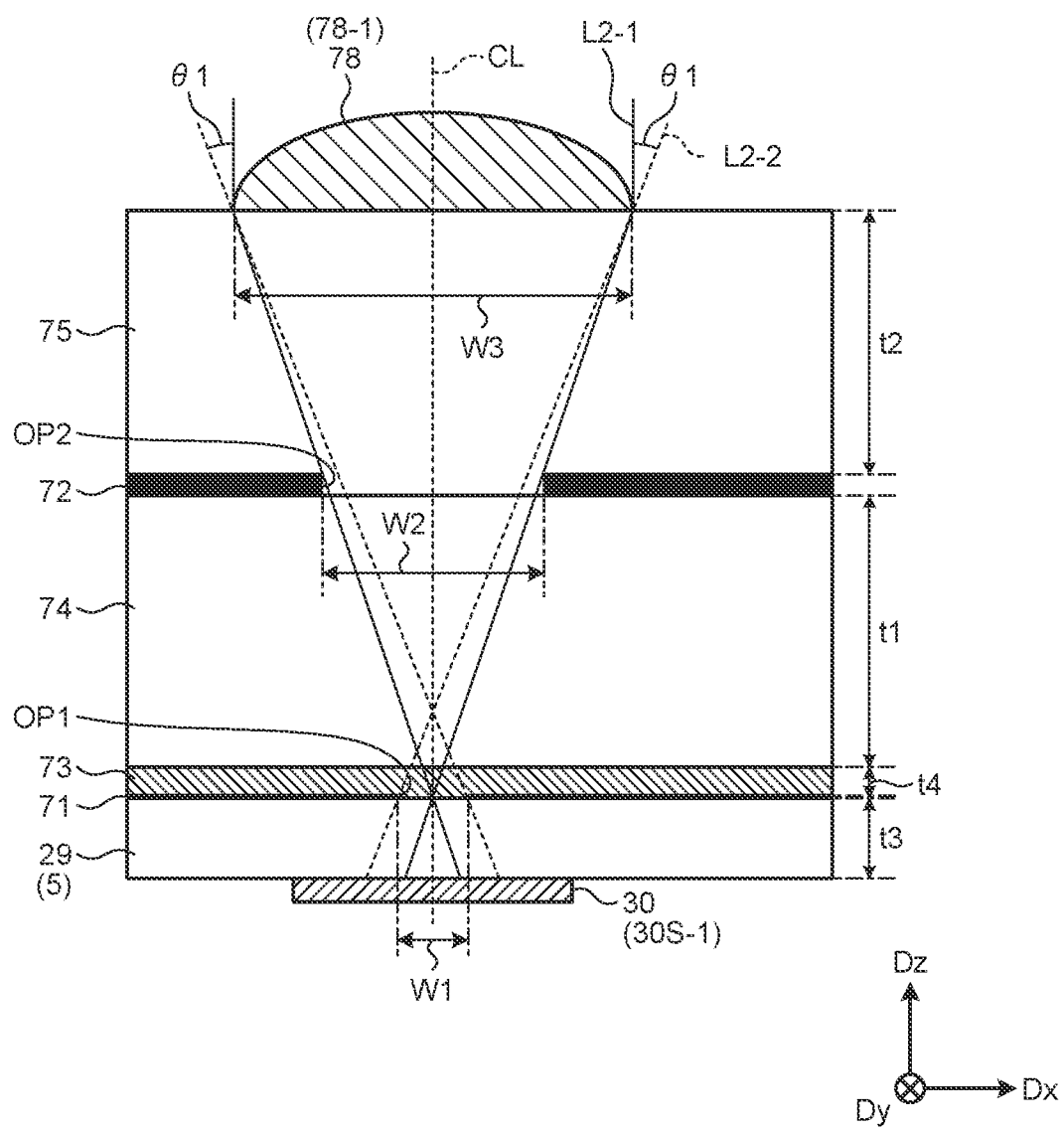
FIG. 6 is a sectional view illustrating the optical filter.

FIG. 6 is a sectional view illustrating the optical filter. FIG. 6 is a VI-VI' sectional view of FIG. 5. FIG. 6 illustrates a simplified configuration of the sensor substrate 5 and schematically illustrates the photodiode 30 (partial photodiode 30S-1) and a protective film 29 covering the photodiode 30.

As illustrated in FIG. 6, the optical filter 7 includes a first light-blocking layer 71, a second light-blocking layer 72, a filter layer 73, the first light-transmitting resin layer 74, the second light-transmitting resin layer 75, and the lenses 78. In the present embodiment, the first light-blocking layer 71, the filter layer 73, the first light-transmitting resin layer 74, the second light-blocking layer 72, the second light-transmitting resin layer 75, and the lenses 78 are stacked on the protective film 29 in the order as listed.

Each of the lenses 78 is provided in a region overlapping the partial photodiode 30S-1 of a corresponding one of the photodiodes 30. The lens 78 is a convex lens. An optical axis CL of the lens 78 is provided in a direction parallel to the third direction Dz and intersects the partial photodiode 30S-1. The lens 78 is provided directly on the second light-transmitting resin layer 75 so as to be in contact therewith. In the present embodiment, no light-blocking layer or the like is provided on the second light-transmitting resin layer 75 between the adjacent lenses 78.

The first light-blocking layer 71 is provided directly on the protective film 29 of the sensor substrate 5 so as to be in contact therewith. In other words, the first light-blocking layer 71 is provided between the photodiode 30 and the lens 78 in the third direction Dz. The first light-blocking layer 71 is provided with a first opening OP1 in a region overlapping the photodiode 30. The first opening OP1 is formed in a region overlapping the optical axis CL.

The first light-blocking layer 71 is provided directly on the protective film 29 of the sensor substrate 5 so as to be in contact therewith. The first light-blocking layer 71 is formed of, for example, a metal material such as molybdenum (Mo). This material allows the first light-blocking layer 71 to reflect the components of the light L2 traveling in the oblique directions other than the light L2 passing through the first opening OP1. Since the first light-blocking layer 71 is formed of a metal material, the first opening OP1 can be accurately formed to have a width W1 (diameter) in the first direction Dx. Thus, the first opening OP1 can be provided corresponding to the photodiodes 30 even if the arrangement pitch and the area of the photodiodes 30 are small.

The first light-blocking layer 71 is formed by applying processing of forming the first opening OP1 in a metal material deposited by, for example, being sputtered on the protective film 29 of the sensor substrate 5. Thus, the first light-blocking layer 71 is different from a light-blocking layer formed by attaching what is called an external optical filter onto the protective film 29 of the sensor substrate 5. In the case of attaching the external optical filter to the sensor substrate 5, it is highly difficult, in particular, to align the position of an opening of a light-blocking layer corresponding to the first opening OP1 of the first light-blocking layer 71 of the present embodiment with the position of the partial photodiode 30S-1. In contrast, since the optical filter 7 of the present embodiment is directly formed on the protective film 29 of the sensor substrate 5, the first opening OP1 can be provided directly above the partial photodiode 30S-1 more accurately than in the case of attaching the external optical filter.

In addition, unlike the second light-blocking layer 72 formed of a resin material to be described later, the first light-blocking layer 71 is formed of a metal material. Therefore, the first light-blocking layer 71 can be formed to be thinner than the second light-blocking layer 72 and can have the first opening OP1 formed therein that is smaller than a second opening OP2 formed in the second light-blocking layer 72. The thickness of the first light-blocking layer 71 is equal to or less than one tenth the thickness of the second light-blocking layer 72. As an example, the thickness of the first light-blocking layer 71 is equal to or greater than 0.055 and is, for example, 0.065 µm; and the thickness of the second light-blocking layer 72 is, for example, 1 µm. The first light-blocking layer 71 is formed to have a much less thickness than that of the second light-blocking layer 72.

The filter layer 73 is provided directly on the first light-blocking layer 71 so as to be in contact therewith. In other words, the filter layer 73 is provided between the first light-blocking layer 71 and the first light-transmitting resin layer 74 in the third direction Dz. The filter layer 73 also covers a region overlapping the first opening OP1 and contacts the protective film 29 of the sensor substrate 5 with the first opening OP1 therebetween. The filter layer 73 is a filter that blocks light in a predetermined wavelength band. The filter layer 73 is, for example, an infrared (IR) cut filter that is formed of a resin material colored in green and blocks infrared rays. With this configuration, the optical filter 7 can increase the detection sensitivity by allowing a component of the light L2 in a wavelength band required for the fingerprint detection to enter the photodiode 30. The position of the filter layer 73 is not limited to be on the first light-blocking layer 71 and may be on the first light-transmitting resin layer 74, on the second light-blocking layer 72, or on the second light-transmitting resin layer 75. When the filter layer 73 is formed on the second light-transmitting resin layer 75, the lens 78 is formed directly on the filter layer 73 so as to be in contact therewith.

The first light-transmitting resin layer 74 is provided directly on the filter layer 73 so as to be in contact therewith. In other words, the first light-transmitting resin layer 74 is provided between the first light-blocking layer 71 and the second light-blocking layer 72 in the third direction Dz. The first light-transmitting resin layer 74 and the second light-transmitting resin layer 75 are formed of, for example, a light-transmitting acrylic resin.

The second light-blocking layer 72 is provided directly on the first light-transmitting resin layer 74 so as to be in contact therewith. In other words, the second light-blocking layer 72 is provided between the first light-blocking layer 71 and the lens 78 in the third direction Dz. The second light-blocking layer 72 is provided with the second opening OP2 in a region overlapping the photodiode 30 and the first opening OP1. The second opening OP2 is formed in a region overlapping the optical axis CL. More preferably, the center of the second opening OP2 and the center of the first opening OP1 are provided so as to overlap the optical axis CL.

The second light-blocking layer 72 is formed of, for example, a resin material colored in black. The second light-blocking layer 72 is not limited to the example of being formed of a resin material colored in black, and may be formed of a metal material having blackened surfaces. With the above-described configuration, the second light-blocking layer 72 serves as a light-absorbing layer that absorbs the components of the light L2 traveling in the oblique directions other than the light L2 passing through the second opening OP2. The second light-blocking layer 72 also absorbs light reflected by the first light-blocking layer 71. When this configuration is compared with a configuration in which the second light-blocking layer 72 is formed of a metal material, the light reflected by the first light-blocking layer 71 can be restrained more from being reflected a plurality of number of times and traveling as stray light through the first light-transmitting resin layer 74 to enter other photodiodes 30. The second light-blocking layer 72 can also absorb outside light incident from between the adjacent lenses 78. Thus, light reflected by the second light-blocking layer 72 can be reduced as compared to the configuration in which the second light-blocking layer 72 is formed of a metal material.

The second light-transmitting resin layer 75 is provided directly on the second light-blocking layer 72 so as to be in contact therewith. In other words, the second light-transmitting resin layer 75 is provided between the second light-blocking layer 72 and the lens 78. The second light-transmitting resin layer 75 also covers a region overlapping the second opening OP2 and contacts the first light-transmitting resin layer 74 through the second opening OP2.

The same material as that of the first light-transmitting resin layer 74 is used for the second light-transmitting resin layer 75, and thus, the refractive index of the second light-transmitting resin layer 75 is substantially equal to the refractive index of the first light-transmitting resin layer 74. Consequently, the light L2 can be restrained from being reflected on an interface between the first light-transmitting resin layer 74 and the second light-transmitting resin layer 75 in the second opening OP2. However, the present disclosure is not limited to this case. The first light-transmitting resin layer 74 and the second light-transmitting resin layer 75 may be formed of different materials, and the refractive index of the first light-transmitting resin layer 74 may differ from the refractive index of the second light-transmitting resin layer 75.

In the present embodiment, the width decreases in the order of a width W3 (diameter) of the lens 78 in the first direction Dx, a width W2 (diameter) of the second opening OP2 in the first direction Dx, and the width W1 of the first opening OP1 (diameter) in the first direction Dx. The width W1 (diameter) of the first opening OP1 in the first direction Dx is less than the width of the partial photodiode 30S-1 of the photodiode 30 in the first direction Dx. The width W1 is 2 µm to 10 µm, and is, for example, approximately 3.5 µm. The width W2 is 3 µm to 20 µm, and is, for example, approximately 10.0 µm. The width W3 is 10 µm to 50 µm, and is, for example, approximately 21.9 µm.

A thickness t2 of the second light-transmitting resin layer 75 illustrated in FIG. 6 is set to be substantially the same as a thickness t1 of the first light-transmitting resin layer 74 or less than the thickness t1 of the first light-transmitting resin layer 74. The thickness t1 of the first light-transmitting resin layer 74 and the thickness t2 of the second light-transmitting resin layer 75 are set to be greater than a thickness t4 of the filter layer 73. The thickness t1 of the first light-transmitting resin layer 74 and the thickness t2 of the second light-transmitting resin layer 75 are also greater than a thickness t3 of the protective film 29 of the sensor substrate 5. The thickness t1 is 3 µm to 20 µm, and is, for example, approximately 11.5 µm. The thickness t2 is 3 µm to 20 µm, and is, for example, approximately 10 µm. The thickness t3 is 1 µm to 10 µm, and is, for example, equal to or greater than 4.5 µm. The thickness t4 of the filter layer 73 is exemplarily 1 µm to 5 µm, and is set to be less than the thickness t3.

With the above-described configuration, light L2-1 traveling in the third direction Dz among beams of the light L2 reflected by the object to be detected such as the finger Fg is condensed by the lens 78, and passes through the second opening OP2 and the first opening OP1 to enter the photodiode 30. Light L2-2 tilted by an angle θ1 from the third direction Dz also passes through the second opening OP2 and the first opening OP1 to enter the partial photodiode 30S-1.

Figure 7:
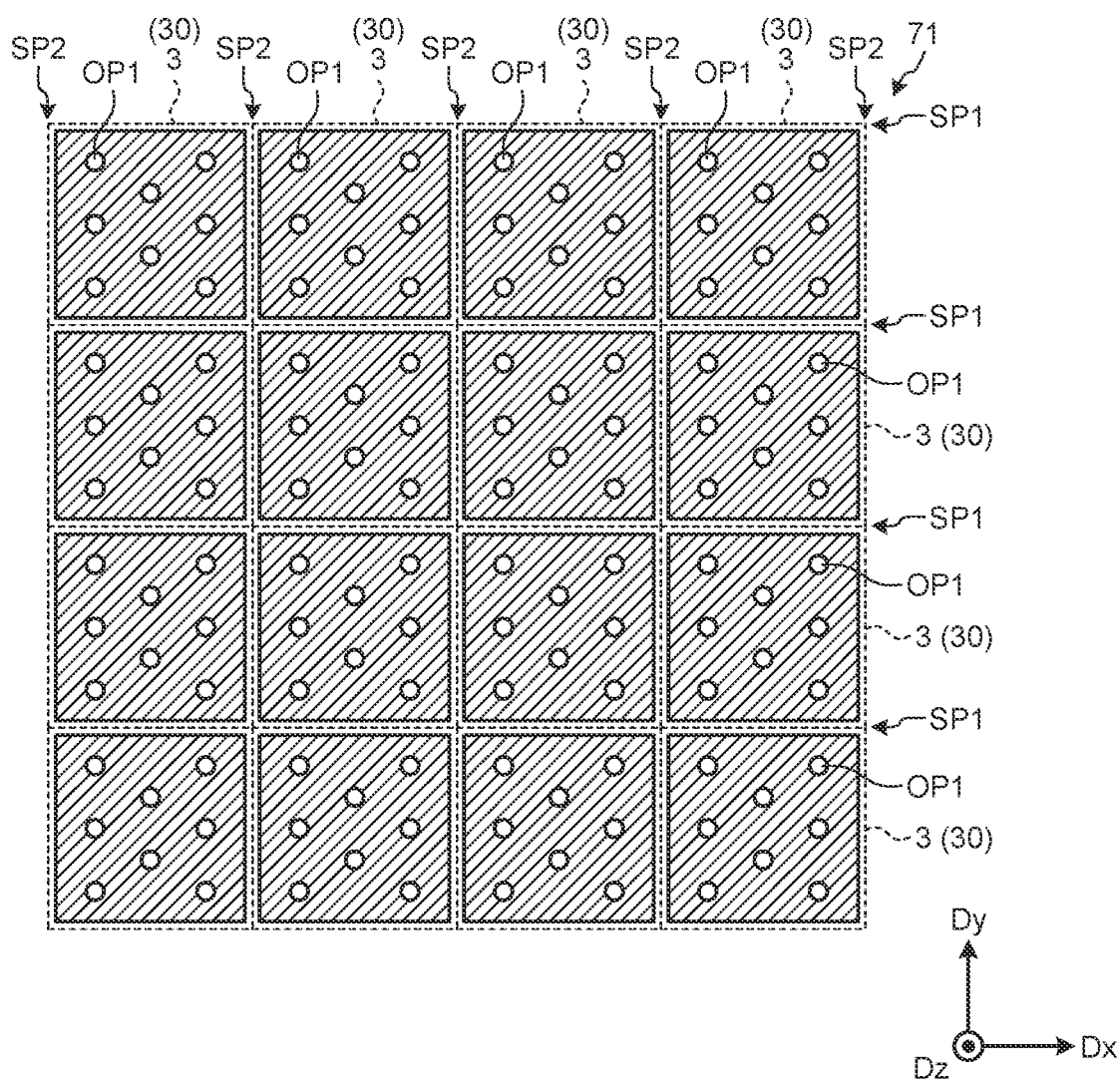
FIG. 7 is a plan view schematically illustrating a first light-blocking layer.

The following describes planar structures of the first light-blocking layer 71 and the second light-blocking layer 72. FIG. 7 is a plan view schematically illustrating the first light-blocking layer 71. In FIG. 7, for ease of viewing, the above-described region in which a metal material serving as the first light-blocking layer 71 is formed is illustrated with oblique lines. As illustrated in FIG. 7, the first light-blocking layer 71 is provided with a plurality of the first openings OP1 and a plurality of slits SP1 and SP2. The slits SP1 and SP2 are provided in regions overlapping gaps between the adjacent detection elements 3 (photodiodes 30).

The slits SP1 and the slits SP2 are provided in a grid shape by intersecting each other. In other words, the first light-blocking layer 71 is separated into a plurality of parts each having a rectangular shape by the slits SP1 and SP2, and the separated first light-blocking layers 71 are provided in a matrix having a row-column configuration so as to be separated at intervals of the photodiodes 30. The first light-blocking layers 71 can also be said to be arranged so as to be separated from one another by the slits SP1 and SP2 between the adjacent first light-blocking layers 71 in each of which the first light-blocking layer 71 is not formed. The separated first light-blocking layers 71 can also be said to be provided in a matrix such that one of the separated first light-blocking layer 71 is separated so as to correspond to one of the detection elements 3 including one of the photodiodes 30 (FIG. 4).

More specifically, each of the slits SP1 extends in the first direction Dx and is provided in a region between the photodiodes 30 adjacent in the second direction Dy. The slits SP1 extend along the photodiodes 30 arranged in the first direction Dx (row direction). The slits SP1 are provided one for each detection element row including corresponding ones of the photodiodes 30 arranged in the first direction Dx.

Each of the slits SP2 extends in the second direction Dy and is provided in a region between the photodiodes 30 adjacent in the first direction Dx. The slits SP2 extend along the photodiodes 30 arranged in the second direction Dy (column direction). The slits SP2 are provided one for each detection element column including corresponding ones of the photodiodes 30 arranged in the second direction Dy.

The first openings OP1 are provided separately from the slits SP1 and SP2. Eight of the first openings OP1 are provided so as to overlap a region surrounded by the slits SP1 and SP2, that is, so as to overlap one photodiode 30. The first openings OP1 are provided corresponding to partial photodiodes 30S-1, 30S-2, . . . , 30S-8 (refer to FIG. 10).

Each of the slits SP1 and SP2 has a width of, for example, several micrometers to several tens of micrometers. Each of the slits SP1 and SP2 is formed to have a width, for example, substantially equal to the width W1 of the first opening OP1.

Figure 8:
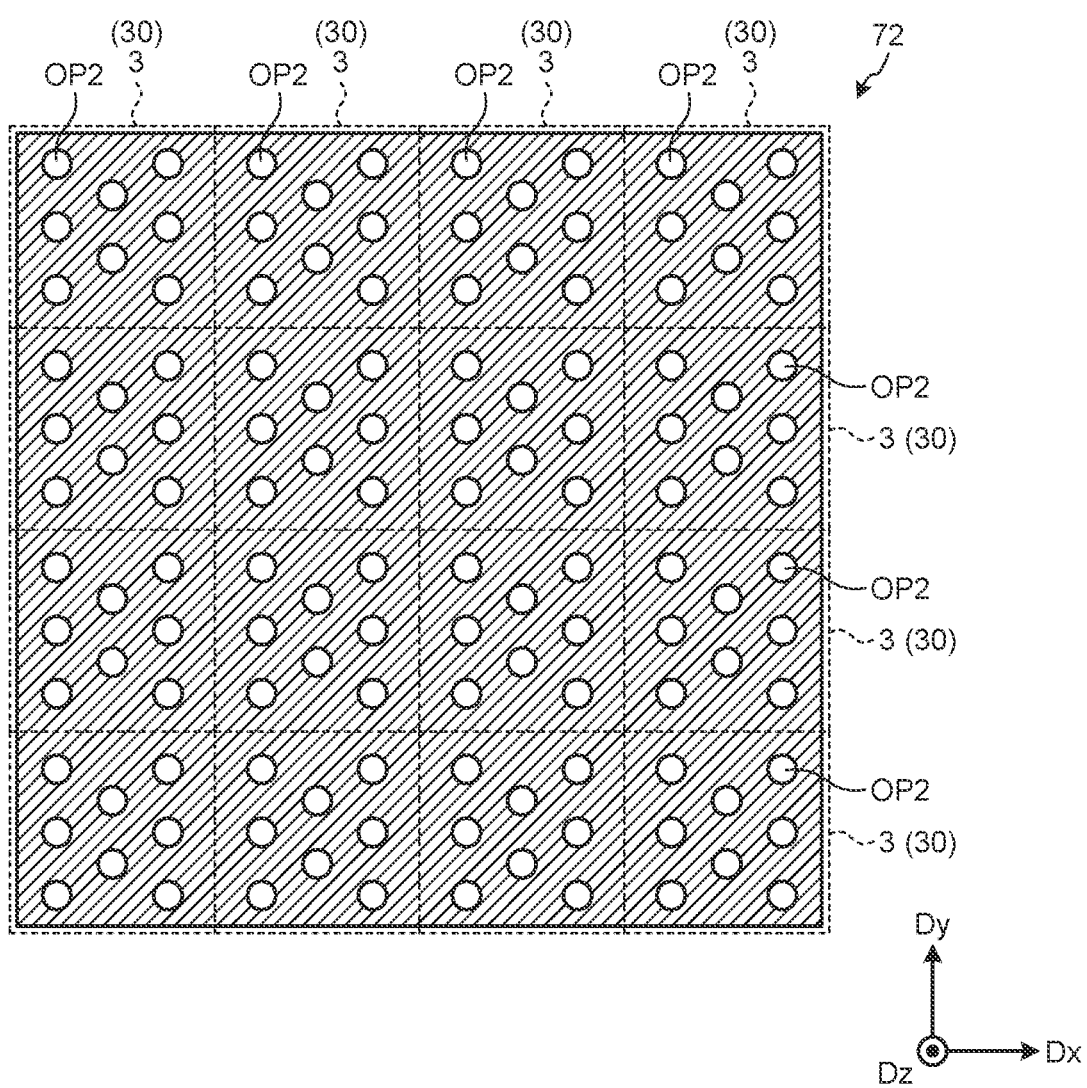
FIG. 8 is a plan view schematically illustrating a second light-blocking layer.

FIG. 8 is a plan view schematically illustrating the second light-blocking layer. As illustrated in FIG. 8, the second light-blocking layer 72 is not provided with the slits SP1 and SP2. That is, the second light-blocking layer 72 is provided so as to be continuous across the adjacent photodiodes 30 and is provided so as to overlap the slits SP1 and SP2 illustrated in FIG. 7. The second openings OP2 are respectively provided in positions overlapping the first openings OP1.

With the above-described configuration, even when a difference in thermal shrinkage is generated between the first light-blocking layer 71 formed of a metal material and the protective film 29 formed of a resin material, strains (stresses) generated in the first light-blocking layer 71 are reduced because the first light-blocking layer 71 is provided with the slits SP1 and SP2. As a result, the first light-blocking layer 71 can be restrained from having asperities or wrinkles generated thereon and thus can be restrained from having a shape defect, as compared to a case where the first light-blocking layer 71 is not provided with the slits SP1 and SP2 and is continuously formed in the detection region AA.

The slits SP1 and SP2 also serve as a vent hole allowing passage of a gas emitted from the protective film 29 of the sensor substrate 5, for example, during a manufacturing process or a durability test of the detection device 1. That is, since the emitted gas can be restrained from accumulating between the sensor substrate 5 and the first light-blocking layer 71 as compared to the case where the first light-blocking layer 71 is not provided with the slits SP1 and SP2, the emitted gas can be restrained from generating the asperities or wrinkles of the first light-blocking layer 71.

Figure 9:
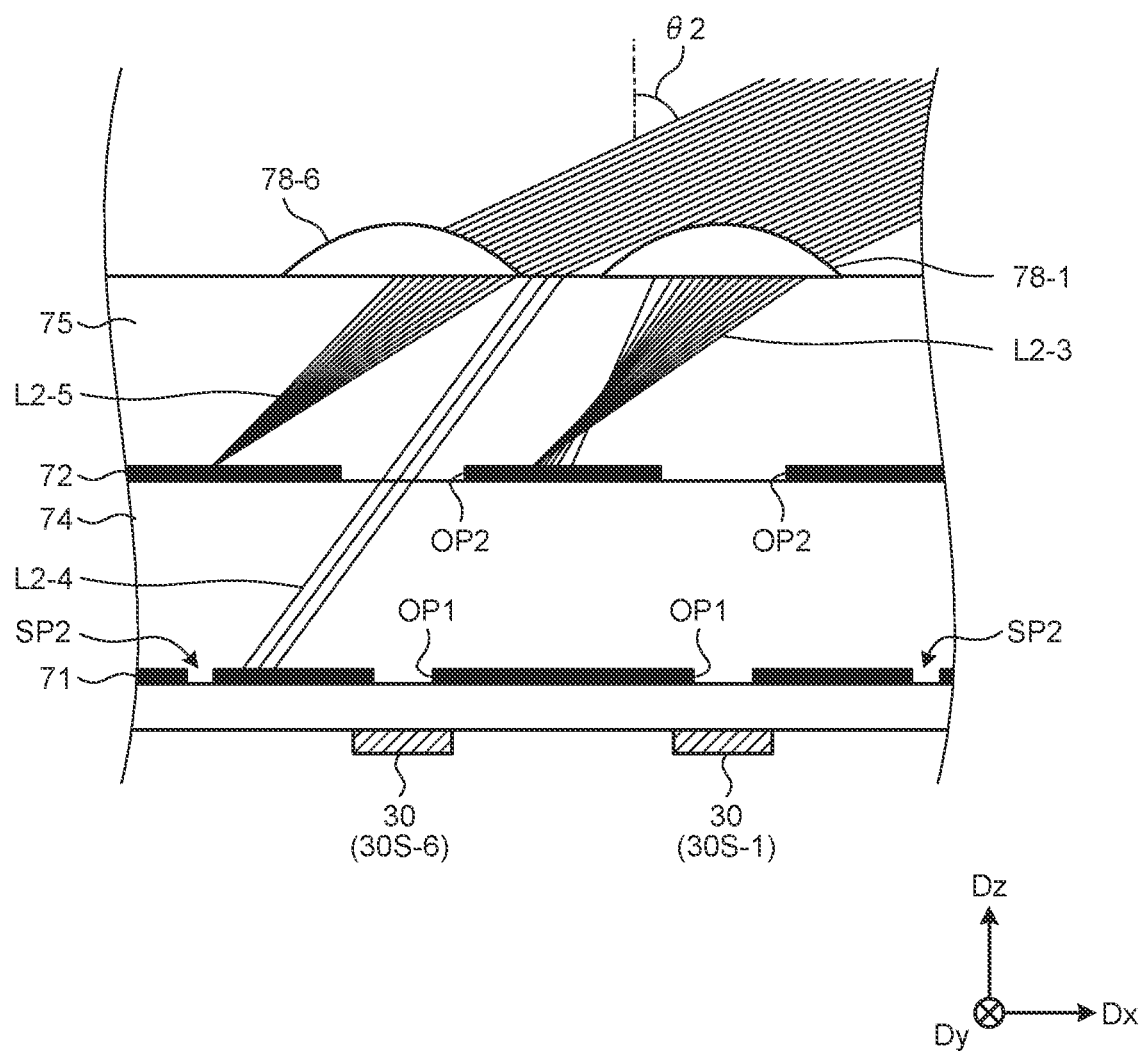
FIG. 9 is an explanatory diagram for schematically explaining travel of light when the light is incident on the optical filter in an oblique direction.

FIG. 9 is an explanatory diagram for schematically explaining travel of light when the light is incident on the optical filter in an oblique direction. FIG. 9 schematically illustrates a sectional structure of the two adjacent lenses 78-1 and 78-6. The lenses 78-1 and 78-6 are provided in positions overlapping the partial photodiodes 30S-1 and 30S-6, respectively, of the photodiode 30. FIG. 9 also illustrates a case where the light L2 traveling in a direction oblique to the third direction Dz is incident on the optical filter 7. In the example illustrated in FIG. 9, an angle θ2 formed by the light L2 and the third direction Dz is, for example, 65°.

As illustrated in FIG. 9, the light L2 that has entered the lenses 78-1 and 78-6 in the oblique direction is condensed as light L2-3 and L2-5, respectively, and is blocked by the second light-blocking layer 72. The light L2 that has entered the second light-transmitting resin layer 75 between the adjacent lenses 78 is refracted at the upper surface of the second light-transmitting resin layer 75, and travels as light L2-4 in the second light-transmitting resin layer 75. A part of the light L2-4 is blocked by the second light-blocking layer 72. A component of the light L2-4 that has passed through the second opening OP2 is blocked by the first light-blocking layer 71.

As described above, since the first light-blocking layer 71 and the second light-blocking layer 72 are provided, the optical filter 7 can block the light L2 incident from the oblique direction to reduce occurrence of what is called crosstalk more effectively than in a case where the optical filter 7 is formed including only one light-blocking layer (for example, in a case where the optical filter 7 is not provided with the second light-blocking layer 72 and is formed including only the first light-blocking layer 71 in FIG. 9).

Even in the case where the first light-blocking layer 71 and the second light-blocking layer 72 are provided, the light L2 incident in the direction parallel to the third direction Dz can efficiently enter the photodiode 30 by being restrained from being blocked by the first light-blocking layer 71 and the second light-blocking layer 72. As described above, the detection device 1 can reduce the occurrence of the crosstalk to improve the detection accuracy.

As illustrated in FIG. 9, the slits SP1 and SP2 of the first light-blocking layer 71 are provided in regions not overlapping the photodiode 30 (partial photodiodes 30S-1 and 30S-6), and in addition, the second light-blocking layer 72 is provided so as to cover the slits SP1 and SP2. Moreover, as described above, the thickness t3 of the protective film 29 (refer to FIG. 6) is set to be less than the thickness t1 of the first light-transmitting resin layer 74 and the thickness t2 of the second light-transmitting resin layer 75.

With this configuration, in the optical filter 7, the second light-blocking layer 72 can restrain the light L2 in oblique directions from entering the slits SP1 and SP2. Even if the light L2 in the oblique directions passes through the second opening OP2 and enters the slits SP1 and SP2, the light L2 in the oblique directions that have passed through the slits SP1 and SP2 can be restrained from entering the photodiode 30 because the thickness t3 of the protective film 29 is small.

As described above, since being provided with the slits SP1 and SP2, the optical filter 7 can reduce the occurrence of shape defects in the first light-blocking layer 71 and can also reduce the occurrence of the crosstalk.

As illustrated in FIG. 6, the width W2 of the second opening OP2 is set to be greater than the width W1 of the first opening OP1, and the thickness t2 is set to be substantially equal to or less than the thickness t1. If the second light-transmitting resin layer 75 is formed to have the thickness t2 greater than the thickness t1, the second light-blocking layer 72 is disposed in a position farther from the lens 78 in the third direction Dz. As a result, in the structure in which each of the photodiodes 30 includes the partial photodiodes 30S and the opening OP2 is provided for each of the partial photodiodes 30S as illustrated in FIG. 5, the second light-blocking layer 72 may be less capable of sufficiently block the light L2 that has passed through the lens 78 and travels in the oblique directions as the film thickness of the second light-transmitting resin layer 75 is increased. For example, the light L2-5 that has passed through the lens 78-6 in FIG. 9 may pass through the opening OP2 located immediately below the lens 78-1. This phenomenon is more significant as the lenses 78 are more densely arranged in each of the detection elements 3. In the present embodiment, since the thickness t2 is set to be less than the thickness t1, the light L2 traveling in the direction parallel to the third direction Dz can enter the photodiode 30, and the light L2 in the oblique directions can be effectively blocked.

The present disclosure is not limited to the example illustrated in FIG. 6. The second light-blocking layer 72 may have the same thickness as that of the first light-blocking layer 71, or moreover, may be formed to be thinner than the first light-blocking layer 71 is. The film thickness of the second light-blocking layer 72 can be changed as appropriate according to characteristics, including the width W2 of the second opening OP2, required for the optical filter 7. The thickness t2 of the second light-transmitting resin layer 75 may be equal to the thickness t1 of the first light-transmitting resin layer 74, or moreover, may be set to be greater than the thickness t1 of the first light-transmitting resin layer 74. The thickness t2 of the second light-transmitting resin layer 75 can be changed as appropriate according to the characteristics required for the optical filter 7.

Depending on the angle of the incident light, the light may pass through both the second opening OP2 and the first opening OP1 to reach the photodiode 30. Even in this case, the above-described configuration restrains the light incident in the oblique directions to a much smaller light quantity than the light quantity of the light L2 incident in the direction parallel to the third direction Dz.

The optical filter 7 is integrally formed with the sensor substrate 5. That is, the first light-blocking layer 71 of the optical filter 7 is provided directly on the protective film 29 so as to be in contact therewith, and any member such as an adhesive layer is not provided between the first light-blocking layer 71 and the protective film 29. The optical filter 7 is directly formed as a film on the sensor substrate 5 and is formed by being subjected to a process such as patterning. Consequently, the positional accuracy of the first opening OP1, the second opening OP2, and the lens 78 of the optical filter 7 with respect to the photodiode 30 can be improved as compared with the case of attaching the optical filter 7 as a separate component to the sensor substrate 5.

Figure 10:
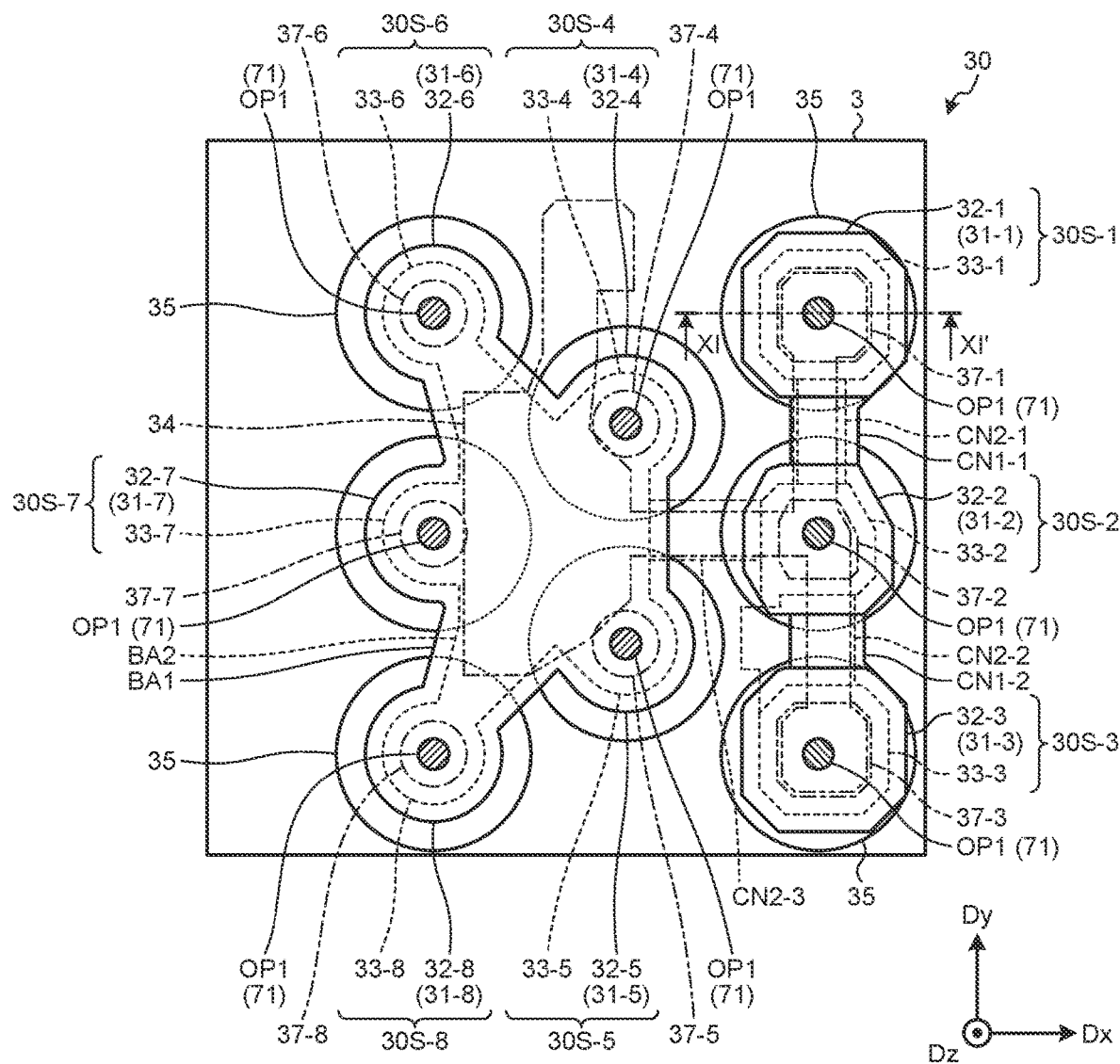
FIG. 10 is a plan view illustrating the detection element.

FIG. 10 is a plan view illustrating the detection element. For ease of viewing, FIG. 10 is illustrated without the transistors included in the detection element 3 and the various types of wiring including, for example, the scan lines and the signal lines. Each of the detection elements 3 is defined, for example, as a region surrounded by the scan lines and the signal lines.

As illustrated in FIG. 10, the photodiode 30 includes the partial photodiodes 30S-1, 30S-2, . . . , 30S-8. The partial photodiodes 30S-1, 30S-2, . . . , 30S-8 are arranged in a triangular lattice pattern. The lenses 78-1, 78-2, ..., 78-8, the first openings OP1 of the first light-blocking layer 71, and the second openings OP2 of the second light-blocking layer 72 illustrated in FIGS. 5 to 8 are provided so as to overlap the respective partial photodiodes 30S-1, 30S-2, ..., 30S-8.

More specifically, the partial photodiodes 30S-1, 30S-2, and 30S-3 are arranged in the second direction Dy. The partial photodiodes 30S-4 and 30S-5 are arranged in the second direction Dy and are adjacent to an element column made up of the partial photodiodes 30S-1, 30S-2, and 30S-3 in the first direction Dx. The partial photodiodes 30S-6, 30S-7, and 30S-8 are arranged in the second direction Dy and are adjacent to an element column made up of the partial photodiodes 30S-4 and 30S-5 in the first direction Dx. The positions in the second direction Dy of the partial photodiodes 30S are arranged in a staggered manner between the adjacent element columns.

The light L2 is incident on the partial photodiodes 30S-1, 30S-2, ..., 30S-8 from the lenses 78-1, 78-2, ..., 78-8, respectively. The partial photodiodes 30S-1, 30S-2, ..., 30S-8 are electrically coupled to one another to serves as one photodiode 30. That is, signals output from the respective partial photodiodes 30S-1, 30S-2, ..., 30S-8 are integrated into one detection signal Vdet to be output from the photodiode 30. In the following description, the partial photodiodes 30S-1, 30S-2, ..., 30S-8 will be simply referred to as the partial photodiodes 30S when need not be distinguished from one another.

Each of the partial photodiodes 30S includes an i-type semiconductor layer 31, an n-type semiconductor layer 32, and a p-type semiconductor layer 33. The i-type semiconductor layer 31 and the n-type semiconductor layer 32 are, for example, of amorphous silicon (a-Si). The p-type semiconductor layer 33 is, for example, of polysilicon (p-Si). The material of each of the semiconductor layers is not limited to those mentioned above and may be, for example, polysilicon or microcrystalline silicon.

The a-Si of the n-type semiconductor layer 32 is doped with impurities to form an n+ region. The p-Si of the p-type semiconductor layer 33 is doped with impurities to form a p+ region. The i-type semiconductor layer 31 is, for example, a non-doped intrinsic semiconductor and has lower conductivity than that of the n-type semiconductor layer 32 and the p-type semiconductor layer 33.

FIG. 10 illustrates an effective sensing region 37 in which the p-type semiconductor layer 33 is coupled to the i-type semiconductor layer 31 (n-type semiconductor layer 32) with a long dashed short dashed line. The first opening OP1 of the first light-blocking layer 71 is provided so as to overlap the sensing region 37.

The partial photodiodes 30S have different shapes from one another in a plan view. The partial photodiodes 30S-1, 30S-2, and 30S-3 are each formed in a polygonal shape. The partial photodiodes 30S-4, 30S-5, 30S-6, 30S-7, and 30S-8 are each formed in a circular shape or a semi-circular shape.

The n-type semiconductor layers 32 of the partial photodiodes 30S-1, 30S-2, and 30S-3 arranged in the second direction Dy are electrically coupled to one another through joints CN1-1 and CN1-2. The p-type semiconductor layers 33 of the partial photodiodes 30S-1, 30S-2, and 30S-3 are electrically coupled to one another through joints CN2-1 and CN2-2.

The n-type semiconductor layers 32 (i-type semiconductor layers 31) of the partial photodiodes 30S-4, 30S-5, 30S-6, 30S-7, and 30S-8 are electrically coupled to one another through a base BA1. The p-type semiconductor layers 33 of the partial photodiodes 30S-4, 30S-5, 30S-6, 30S-7, and 30S-8 are electrically coupled to one another through a base BA2. Each of the base BA1 and the base BA2 is formed in a substantially pentagonal shape and is provided, in the apex positions thereof, with the partial photodiodes 30S-4, 30S-5, 30S-6, 30S-7, and 30S-8. The base BA2 is electrically coupled to the p-type semiconductor layers 33 of the partial photodiodes 30S-1, 30S-2, and 30S-3 through a joint CN2-3. With the above-described configuration, the partial photodiodes 30S constituting each of the photodiodes 30 are electrically coupled to one another.

Each of the lower conductive layer 35 is provided in a region overlapping a corresponding one of the partial photodiodes 30S. The lower conductive layers 35 all have a circular shape in the plan view. That is, the lower conductive layer 35 may have a shape different from that of the partial photodiode 30S. For example, each of the partial photodiodes 30S-1, 30S-2, and 30S-3 has a polygonal shape in the plan view and is formed on the circular lower conductive layer 35. Each of the partial photodiodes 30S-4, 30S-5, 30S-6, 30S-7, and 30S-8 has a circular shape or a semi-circular shape having a diameter smaller than that of the lower conductive layer 35 in the plan view and is formed on the circular lower conductive layer 35. The lower conductive layer 35 is supplied with the reference potential VCOM that is the same as the potential of the p-type semiconductor layer 33, whereby the parasitic capacitance between the lower conductive layer 35 and the p-type semiconductor layer 33 can be reduced.

The upper conductive layer 34 electrically couples the n-type semiconductor layers 32 of the partial photodiode 30S to one another. The upper conductive layer 34 is electrically coupled to the transistors (the reset transistor Mrst and the source follower transistor Msf (refer to FIG. 4)) of the sensor substrate 5. The upper conductive layer 34 may be provided in any manner and may be provided, for example, so as to cover a portion of the partial photodiode 30S, or so as to cover the entire partial photodiode 30S.

In the present embodiment, the partial photodiode 30S is provided for each of the lenses 78 and each of the first openings OP1. This configuration can reduce the parts of the semiconductor layer and wiring layer in a region overlapping neither the lenses 78 nor the first openings OP1 as compared with the case of a configuration in which the photodiode 30 is formed of a solid film having, for example, a quadrilateral shape so as to cover the entire detection element 3 in the plan view. Thus, the parasitic capacitance of the photodiode 30 can be reduced.

The planar structure of the photodiode 30 illustrated in FIG. 10 is merely an example and can be changed as appropriate. The number of the partial photodiodes 30S included in each of the photodiodes 30 may be seven or smaller, or nine of larger. The arrangement of the partial photodiodes 30S is not limited to the triangular lattice pattern. The partial photodiodes 30S may be arranged, for example, in a matrix having a row-column configuration. The arrangement of the lenses 78, the first openings OP1, and the second openings OP2 included in the optical filter 7 can also be changed as appropriate in accordance with the configuration of the partial photodiodes 30S.

Figure 11:
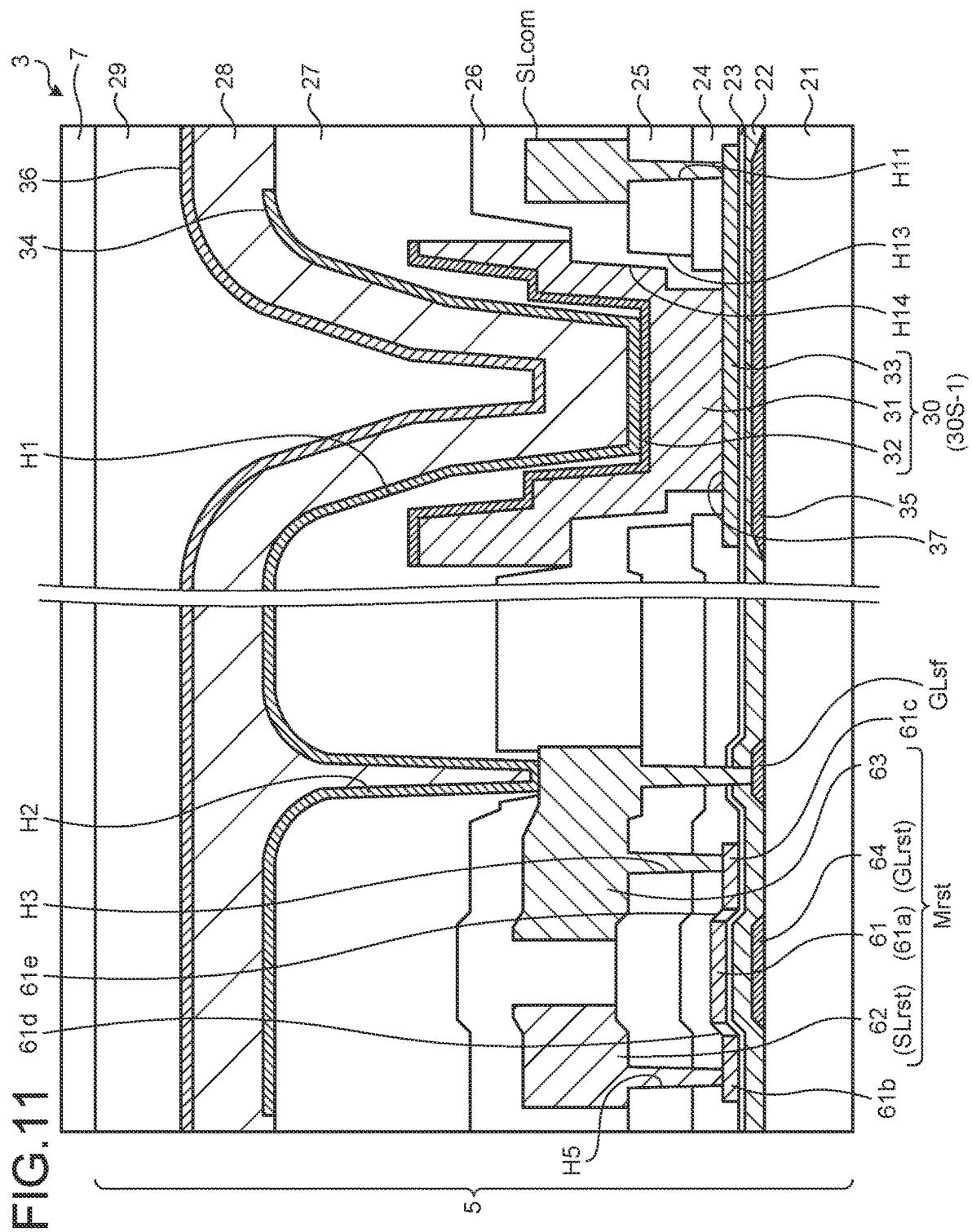
FIG. 11 is a XI-XI' sectional view of FIG. 10.

FIG. 11 is a XI-XI' sectional view of FIG. 10. FIG. 11 illustrates the sectional configuration of the partial photodiode 30S-1 and also the sectional configuration of the reset transistor Mrst included in the detection element 3. The source follower transistor Msf and the read transistor Mrd included in the detection element 3 also have a sectional configuration similar to that of the reset transistor Mrst.

The substrate 21 is an insulating substrate, and is formed using, for example, a glass substrate of, for example, quartz or alkali-free glass, or a resin substrate of, for example, polyimide. Gate electrodes 64 are provided on the substrate 21. Insulating films 22 and 23 are provided on the substrate 21 so as to cover the gate electrodes 64. The insulating films 22 and 23 and insulating films 24, 25, and 26 are inorganic insulating films and are formed of, for example, a silicon oxide ($SiO_2$) or a silicon nitride (SiN).

A semiconductor layer 61 is provided on the insulating film 23. For example, polysilicon is used as the semiconductor layer 61. The semiconductor layer 61 is, however, not limited thereto, and may be formed of, for example, a microcrystalline oxide semiconductor, an amorphous oxide semiconductor, or low-temperature polycrystalline silicon (LTPS). The reset transistor Mrst has a bottom-gate structure in which the gate electrode 64 is provided on the lower side of the semiconductor layer 61. However, the reset transistor Mrst may have a top-gate structure in which the gate electrode 64 is provided on the upper side of the semiconductor layer 61, or a dual-gate structure in which the gate electrodes 64 are provided on the upper side or lower side of the semiconductor layer 61.

The semiconductor layer 61 has a channel region 61a, high-concentration impurity regions 61b and 61c, and low-concentration impurity regions 61d and 61e. The channel region 61a is, for example, a non-doped intrinsic semiconductor region or a low-impurity region and has lower conductivity than that of the high-concentration impurity regions 61b and 61c and the low-concentration impurity regions 61d and 61e. The channel region 61a is provided in a region overlapping the gate electrode 64.

The insulating films 24 and 25 are provided on the insulating film 23 so as to cover the semiconductor layer 61. A source electrode 62 and a drain electrode 63 are provided on the insulating film 25. The source electrode 62 is coupled to the high-concentration impurity region 61b of the semiconductor layer 61 through a contact hole H5. The drain electrode 63 is coupled to the high-concentration impurity region 61c of the semiconductor layer 61 through a contact hole H3. The source electrode 62 and the drain electrode 63 are each formed of, for example, a multilayered film of Ti—Al—Ti or Ti—Al having a multilayered structure of titanium and aluminum.

Gate lines GLsf are wiring coupled to the gates of the source follower transistors Msf. Each of the gate lines GLsf is provided in the same layer as that of the gate electrodes 64. The drain electrode 63 (coupling wiring SLcn) is coupled to the gate line GLsf through a contact hole penetrating from the insulating film 22 to the insulating film 25.

The following describes the sectional configuration of the photodiode 30. While the partial photodiode 30S-1 is described using FIG. 11, the description of the partial photodiode 30S-1 can also be applied to the other partial photodiodes 30S-2, . . . , 30S-8. As illustrated in FIG. 11, the lower conductive layer 35 is provided in the same layer as that of the gate electrode 64 and the gate line GLsf on the substrate 21. The insulating films 22 and 23 are provided on the lower conductive layer 35. The photodiode 30 is provided on the insulating film 23. In other words, the lower conductive layer 35 is provided between the substrate 21 and the p-type semiconductor layer 33. The lower conductive layer 35 is formed of the same material as that of the gate electrode 64 and thereby serves as a light-blocking layer. The lower conductive layer 35 can restrain light from entering the photodiode 30 from the substrate 21 side.

The i-type semiconductor layer 31 is provided between the p-type semiconductor layer 33 and the n-type semiconductor layer 32 in the third direction Dz. In the present embodiment, the p-type semiconductor layer 33, the i-type semiconductor layer 31, and the n-type semiconductor layer 32 are stacked on the insulating film 23 in the order as listed. The effective sensing region 37 illustrated in FIG. 10 is a region in which the i-type semiconductor layer 31 is coupled to the p-type semiconductor layer 33.

Specifically, the p-type semiconductor layer 33 is provided in the same layer as that of the semiconductor layer 61 on the insulating film 23. The insulating films 24, 25, and 26 are provided so as to cover the p-type semiconductor layer 33. The insulating films 24 and 25 are provided with contact holes H11 and H13 in positions overlapping the p-type semiconductor layer 33. The insulating film 26 is provided on the insulating film 25 so as to cover the transistors including the reset transistor Mrst. The insulating film 26 covers side surfaces of the insulating films 24 and 25 constituting inner walls of the contact holes H11 and H13. The insulating film 26 is provided with a contact hole H14 in a position overlapping the p-type semiconductor layer 33.

The i-type semiconductor layer 31 is provided on the insulating film 26 and is coupled to the p-type semiconductor layer 33 through the contact hole H14 penetrating from the insulating film 24 to the insulating film 26. The n-type semiconductor layer 32 is provided on the i-type semiconductor layer 31.

An insulating film 27 is provided on the insulating film 26 so as to cover the photodiode 30. The insulating film 27 is provided so as to be directly in contact with the photodiode 30 and the insulating film 26. The insulating film 27 is formed of an organic material such as a photosensitive acrylic resin. The insulating film 27 is thicker than the insulating film 26 is. The insulating film 27 has a better step covering property than that of inorganic insulating materials and is provided so as to cover side surfaces of the i-type semiconductor layer 31 and the n-type semiconductor layer 32.

The upper conductive layer 34 is provided on the insulating film 27. The upper conductive layer 34 is formed of, for example, a light-transmitting conductive material such as indium tin oxide (ITO). The upper conductive layer 34 is provided along a surface of the insulating film 27 and is coupled to the n-type semiconductor layer 32 through a contact hole H1 provided in the insulating film 27. The upper conductive layer 34 is also electrically coupled to the drain electrode 63 of the reset transistor Mrst and the gate line GLsf through a contact hole H2 provided in the insulating film 27.

An insulating film 28 is provided on the insulating film 27 so as to cover the upper conductive layer 34. The insulating film 28 is an inorganic insulating film. The insulating film 28 is provided as a protective layer for restraining water from entering the photodiode 30. An overlapping conductive layer 36 is provided on the insulating film 28. The overlapping conductive layer 36 is formed of, for example, a light-transmitting conductive material such as ITO. The overlapping conductive layer 36 is a conductive layer for supplying the power supply potential VDD to the source follower transistor Msf and is electrically coupled to the source follower transistor Msf and so forth at any positions.

The protective film 29 is provided on the insulating film 28 so as to cover the overlapping conductive layer 36. The protective film 29 is an organic conductive film. The protective film 29 is formed so as to planarize a surface of the detection device 1.

In the present embodiment, the p-type semiconductor layer 33 and the lower conductive layer 35 of the photodiode 30 are provided in the same layers as those of the transistors. Therefore, the manufacturing process can be simpler than in a case where the photodiode 30 is formed in layers different from those of the transistors.

The sectional configuration of the photodiode 30 illustrated in FIG. 11 is merely an example. The sectional configuration is not limited to this example. For example, the photodiode 30 may be provided in layers different from those of the transistors or may be provided by including the p-type semiconductor layer 33, the i-type semiconductor layer 31, and the n-type semiconductor layer 32 stacked on the insulating film 26 in the order as listed.

As described above, the detection device 1 of the present embodiment includes the substrate 21, the photodiodes 30 arranged on the substrate 21, and the optical filter 7 that covers the photodiodes 30. The optical filter 7 includes the lenses 78 provided so as to overlap the respective photodiodes 30, the first light-blocking layer 71 that is provided between the photodiodes 30 and the lenses 78 and is provided with the first openings OP1 in the regions overlapping the respective photodiodes 30, and the second light-blocking layer 72 that is provided between the first light-blocking layer 71 and the lenses 78 and is provided with the second openings OP2 in the regions overlapping the respective photodiodes 30 and the respective first openings OP1. The first light-blocking layer 71 is provided with the slits SP1 and SP2 in the regions overlapping the gaps between the adjacent photodiodes 30. The second light-blocking layer 72 is provided so as to be continuous across the adjacent photodiodes 30 and is provided so as to overlap the slits SP1 and SP2.

With this configuration, since the first light-blocking layer 71 and the second light-blocking layer 72 are provided between the photodiodes 30 and the lenses 78, the optical filter 7 can allow the light L2 traveling in the direction parallel to the third direction Dz to enter the photodiodes 30 and can also effectively block the light L2 in the oblique directions to reduce the occurrence of the crosstalk. In addition, since the first light-blocking layer 71 is divided by the slits SP1 and SP2 into a plurality of arranged portions, the stresses generated in the first light-blocking layer 71 are effectively reduced. Therefore, the optical filter 7 can reduce the generation of the asperities or wrinkles of the first light-blocking layer 71, which would be caused by, for example, the difference in thermal shrinkage between the first light-blocking layer 71 and the layer (protective film 29) on which the first light-blocking layer 71 is stacked. As a result, the detection device 1 can improve the detection accuracy and can also reduce the occurrence of shape defects in the first light-blocking layer 71.

FIG. 12 is a plan view schematically illustrating a first light-blocking layer according to a fourth modification of the embodiment. In the following description, the same components as those described in the above-described embodiment are denoted by the same reference numerals, and the duplicate description thereof will be omitted.

In the above-described embodiment, as illustrated in FIG. 7, the slits SP1 and SP2 are provided in a grid shape at intervals of the photodiode 30. However, the arrangement of the slits SP1 and SP2 is not limited thereto. The slits SP1 and SP2 only need to be provided so as to be capable of effectively reduce the stresses generated in the first light-blocking layer 71, or so as to be capable of allowing the emitted gas from the sensor substrate 5 side to pass therethrough.

As illustrated in FIG. 12, first light-blocking layers 71A of the fourth modification are provided with the slits SP1 but are not provided with the slits SP2. The slits SP1 extend along the photodiodes 30 arranged in the first direction Dx (row direction). The first light-blocking layer 71A is separated into a plurality of parts by the slits SP1, and the separated first light-blocking layers 71A are provided one for each detection element row. That is, each of the first light-blocking layers 71A separated by the slits SP1 has a strip shape extending in the first direction Dx. The strip-shaped first light-blocking layers 71A extending in the first direction Dx are provided so as to overlap the respective detection element rows and are arranged adjacent to one another in the second direction Dy with the slits SP1 interposed therebetween.

Figure 13:
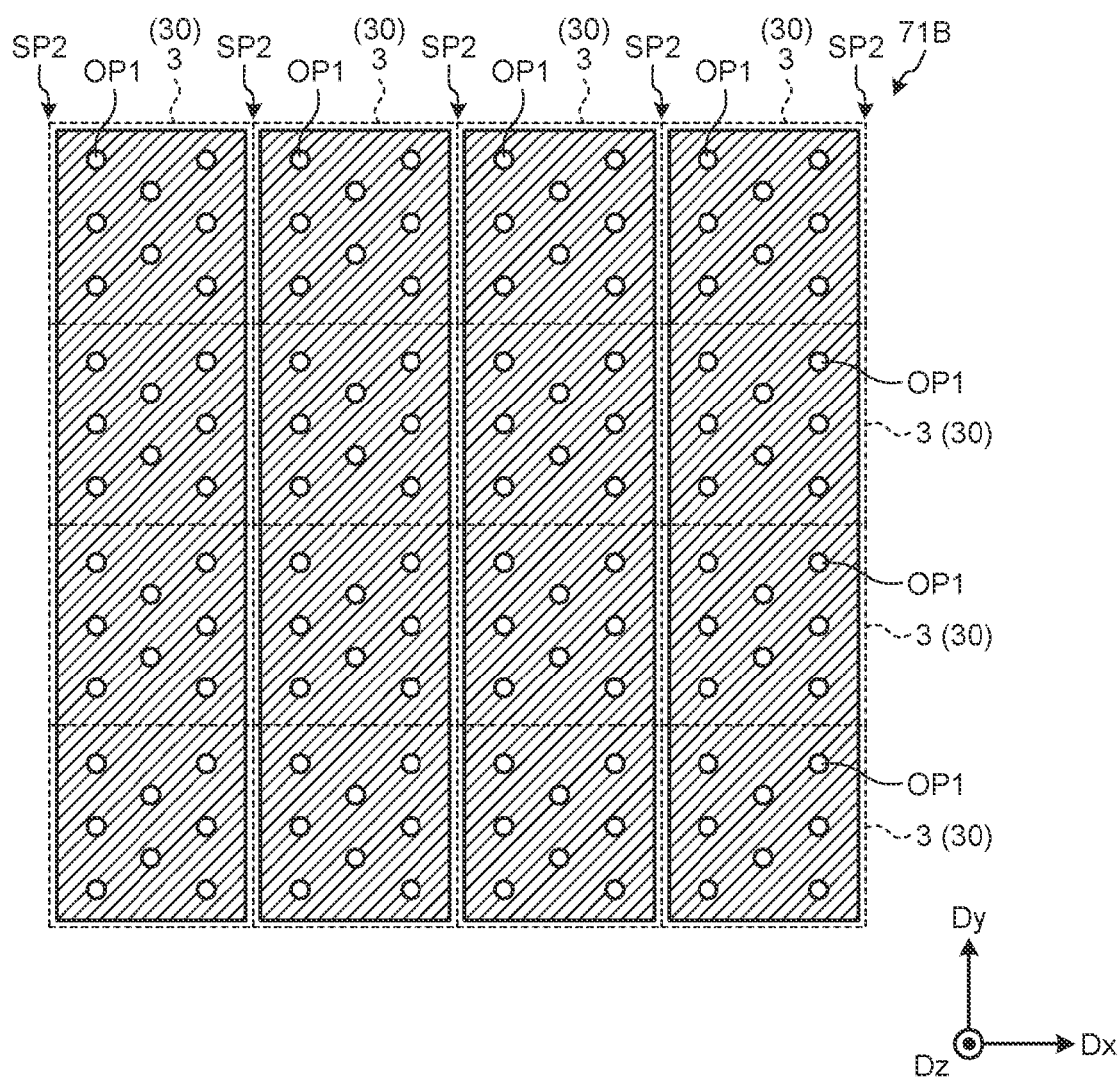
FIG. 13 is a plan view schematically illustrating a first light-blocking layer according to a fifth modification of the embodiment.

FIG. 13 is a plan view schematically illustrating a first light-blocking layer according to a fifth modification of the embodiment. As illustrated in FIG. 13, a first light-blocking layer 71B of the fifth modification is not provided with the slits SP1 but is provided with the slits SP2. The slits SP2 extend along the photodiodes 30 arranged in the column direction (second direction Dy). The first light-blocking layer 71B is separated into a plurality of parts by the slits SP2, and the separated first light-blocking layers 71B are provided one for each detection element column. That is, each of the first light-blocking layers 71B separated by the slits SP2 has a strip shape extending in the second direction Dy. The strip-shaped first light-blocking layers 71B extending in the second direction Dy are provided so as to overlap the respective detection element columns and are arranged adjacent to one another in the first direction Dx with the slits SP2 interposed therebetween.

FIG. 14 is a plan view schematically illustrating a first light-blocking layer according to a sixth modification of the embodiment. As illustrated in FIG. 14, in a first light-blocking layer 71C of the sixth modification, the slits SP1 are provided one for each two detection element rows, and the slits SP2 are provided one for each two detection element columns. The first light-blocking layer 71C is separated into a plurality of parts by the slits SP1 and SP2, and the separated first light-blocking layers 71C are arranged one for each photodiode group made up of a plurality of the photodiodes 30, that is, one for each photodiode group including four photodiodes 30 in two rows and two columns.

The embodiment and the modifications described above can be combined as appropriate. For example, in the sixth modification illustrated in FIG. 14, only either of the slits SP1 and SP2 may be provided. In FIG. 14, the slits SP1 are provided one for each row group made up of two detection element rows, and the slits SP2 are provided one for each column group made up of two detection element columns. The slits SP1 and SP2 are, however, not limited thereto. The slits SP1 may be provided one for each row group made up of three or more detection element rows, and the slits SP2 may be provided one for each column group made up of three or more detection element columns. That is, the slits SP1 and SP2 may be provided one for each plurality of detection element rows and one for each plurality of detection element columns. The width of the slits SP1 and SP2 can also be changed as appropriate. The width and the number (arrangement density) of the slits SP1 and SP2 can be changed as appropriate depending on the stresses (the difference in thermal shrinkage between the first light-blocking layer 71 and the protective film 29) generated in the first light-blocking layer 71 and/or the characteristics required for the optical filter 7.

While the preferred embodiment of the present disclosure has been described above, the present disclosure is not limited to the embodiment described above. The content disclosed in the embodiment is merely exemplary, and can be variously changed within the scope not departing from the gist of the present disclosure. Any modification appropriately made within the scope not departing from the gist of the present disclosure also naturally belongs to the technical scope of the present disclosure. At least one of various omissions, replacements, and modifications of the components can be made without departing from the gist of the embodiment and the modifications thereof described above.

What is claimed is:

1. A detection device comprising:
a substrate;
a plurality of photodiodes arranged on the substrate;
a protective film that covers the photodiodes;
a plurality of lenses provided so as to overlap the respective photodiodes;
a first light-blocking layer that is provided between the photodiodes and the lenses and is provided with first openings in regions overlapping the respective photodiodes; and
a second light-blocking layer that is provided between the first light-blocking layer and the lenses and is provided with second openings in regions overlapping the respective photodiodes and the respective first openings, wherein
the first light-blocking layer includes a plurality of light-blocking regions separated from one another by a plurality of slits, each of the light-blocking regions overlaps at least one of the photodiodes, and each of the slits overlaps none of the photodiodes, and
the second light-blocking layer is provided so as to be continuous across the photodiodes adjacent to each other and is provided so as to overlap the slits.

2. The detection device according to claim 1, wherein
the photodiodes are arranged in a matrix having a row-column configuration,
the slits are provided in a grid shape, and
the separated light-blocking regions are arranged one for each of the photodiodes.

3. The detection device according to claim 1, wherein
the photodiodes are arranged in a matrix having a row-column configuration, and
the slits extend along the photodiodes arranged in a row direction.

4. The detection device according to claim 1, wherein
the photodiodes are arranged in a matrix having a row-column configuration, and
the slits extend along the photodiodes arranged in a column direction.

5. The detection device according to claim 1, comprising:
a first light-transmitting resin layer provided between the first light-blocking layer and the second light-blocking layer; and
a second light-transmitting resin layer provided between the second light-blocking layer and the lenses, wherein
the first light-blocking layer is provided directly on the protective film so as to be in contact with the protective film.

6. An optical filter comprising:
a protective film;
a first light-blocking layer that is directly formed on the protective film;
a second light-blocking layer overlapping the first light-blocking layer;
a plurality of lenses;
a first light-transmitting resin layer located between the first light-blocking layer and the second light-blocking layer; and
a second light-transmitting resin layer located between the second light-blocking layer and the lenses, wherein
the first light-blocking layer includes a plurality of light-blocking regions separated from one another by a plurality of slits and arranged in a matrix having a row-column configuration,
each of the light-blocking regions has a plurality of first openings,
the second light-blocking layer has second openings overlapping the respective first openings, and
the lenses overlap the respective first openings and the respective second openings.

7. The optical filter according to claim 6, wherein the first light-blocking layer has a thickness less than a thickness of the second light-blocking layer.

8. The optical filter according to claim 7, wherein
the second light-transmitting resin layer has a thickness less than a thickness of the first light-transmitting resin layer, and
the protective film has a thickness less than the thickness of the second light-transmitting resin layer.

9. The optical filter according to claim 8, wherein the first openings have a diameter less than a diameter of the second openings.

* * * * *